(12) United States Patent
Feldstein

(10) Patent No.: US 8,841,800 B2
(45) Date of Patent: Sep. 23, 2014

(54) INTELLIGENT BACKUP POWER SYSTEM

(75) Inventor: Daniel A. Feldstein, Norwood, NJ (US)

(73) Assignee: Crestron Electronics Inc., Rockleigh, NJ (US)

(*) Notice: Subject to any disclaimer, the term of this patent is extended or adjusted under 35 U.S.C. 154(b) by 476 days.

(21) Appl. No.: 13/206,753

(22) Filed: Aug. 10, 2011

(65) Prior Publication Data

US 2013/0041519 A1 Feb. 14, 2013

Related U.S. Application Data

(63) Continuation of application No. 13/205,975, filed on Aug. 9, 2011.

(51) Int. Cl.
*H01H 9/54* (2006.01)

(52) U.S. Cl.
USPC .......................................... 307/140

(58) Field of Classification Search
USPC .......................................... 307/140
See application file for complete search history.

(56) References Cited

U.S. PATENT DOCUMENTS

| | | |
|---|---|---|
| 4,508,974 A | 4/1985 | Henderson |
| 5,180,051 A | 1/1993 | Cook et al. |
| 5,315,499 A | 5/1994 | Bilas et al. |
| 7,218,078 B2 | 5/2007 | Gagnon et al. |
| 2012/0092811 A1* | 4/2012 | Chapel et al. .................. 361/622 |

\* cited by examiner

*Primary Examiner* — Robert L. Deberadinis
(74) *Attorney, Agent, or Firm* — Crestron Electronics Inc

(57) ABSTRACT

Presented is a backup power system for a building that selectively provides power to particular circuits according to a power distribution priority profile. Power is applied sequentially to each particular circuit depending on the measured current loads of the particular circuits to which power has already been applied.

17 Claims, 18 Drawing Sheets

INTELLIGENT BACKUP POWER SYSTEM

BACKGROUND OF THE INVENTION

1. Technical Field

The present invention relates generally to backup power systems for buildings, and more particularly to a backup power system that selectively provides power to particular circuits according to a power distribution priority profile, where power is applied sequentially to each particular circuit depending on the measured current loads of the particular circuits to which power has already been applied.

2. Background Art

Emergency or backup power systems start providing power to a building within a few seconds after electricity from utility (power) lines has been interrupted. In a typical backup power system configuration, power lines and a backup generator are connected to a transfer switch. When electricity from the power lines is interrupted, the transfer switch breaks the connection between the power lines and the main breaker of the building and establishes a connection between the generator and the main breaker of the building. The generator thereafter provides power to all the circuit lines in the building. In this configuration, the generator must either supply enough power (with an additional safety margin) to support the entire electrical load created by the building, or enough loads (e.g., lights, equipment, HVAC) must be manually shed so that the generator is not overloaded.

One way to avoid having to use a generator that is big enough to supply power to an entire building, or having to manually shed non-essential circuits and devices to avoid overloading the generator, is to connect a backup generator and only a single particular circuit line (i.e., from a particular single circuit breaker) to a transfer switch. When electricity from the power lines is interrupted, electricity stops flowing to the breaker box and consequently stops flowing to the one particular circuit line. The transfer switch breaks the connection between the one particular circuit line and the breaker box, and establishes a connection between the generator and the one particular circuit line. The generator thereafter provides power only to the devices (i.e., lights, electrical outlets, equipment, etc) connected to that circuit line. The problem with this configuration is that it is unlikely that all essential devices will be connected to the single circuit powered by the backup generator. Additionally, the single powered circuit is likely to include some non-essential devices that are powered by the backup generator. Powering such non-essential devices is a waste of valuable electricity that could be used to power essential devices connected to other circuits.

In another configuration, a backup generator supplies power to a dedicated circuit cabinet. All building circuits that are intended to be powered by the generator must be routed to this cabinet. In this configuration, adding or removing circuits from the group of circuits receiving backup power is very laborious and requires an electrician to re-route the circuits to/from the main breaker box.

Further, such backup power systems are not capable of providing power to circuits and devices that are initially essential (e.g., elevators containing people) and shedding those circuits and devices when they become non-essential after a short time (e.g., elevators after all the people have exited). Moreover, such backup power systems are not capable of prioritizing the circuits and devices to which power is supplied, i.e., provide power to the most critical circuits first, then to the less critical circuits if power is available. Current backup power systems simply supply power to the circuits to which they are connected, and individual devices must be shed manually. Moreover, the circuits and devices that are powered by such backup systems are predetermined and unalterable, and cannot be adjusted based on some event.

Consequently, there exists a need for a backup power system that is capable of providing power to an entire building, prioritizing the supply of power to essential circuits and devices, and automatically shedding all non-essential circuits and devices as available power dictates.

SUMMARY OF THE INVENTION

It is to be understood that both the general and detailed descriptions that follow are exemplary and explanatory only and are not restrictive of the invention

Disclosure of the Invention

According to one aspect, the invention involves a method of providing backup power to each of a plurality of circuits in a building. The method includes a) supplying current to a first of the plurality of circuits according to a power distribution priority profile only if available current is greater than a maximum current rating of the first of the plurality of circuits, b) measuring a current load of the first of the plurality of circuits after current has been supplied, c) subtracting the measured current load the first of the plurality of circuits from the available current, d) supplying current to a next of the plurality of circuits according to the power distribution priority profile only if the available current is greater than a maximum current rating of the next of the plurality of circuits, e) measuring the current load of the next of the plurality of circuits after current has been supplied, f) subtracting the measured current load of the next of the plurality of circuits from the available current, and g) repeating steps d)-f) until each of the plurality of circuits is supplied current, the available current is not greater than a maximum current rating of any of the plurality of circuits not being supplied current, or the available current reaches a predetermined minimum threshold.

In one embodiment, the power distribution priority profile is either an initial power distribution priority profile or a long-term power distribution priority profile. Current is supplied to the plurality of circuits according to the initial power distribution priority profile for a time period of 15-20 minutes following a loss of main power. Current is supplied to the plurality of circuits according to the long-term power distribution priority profile after the time period 15-20 minutes elapses and until main power is restored.

In another embodiment, the method further includes continuously measuring the current load of each of the plurality of circuits being supplied current.

In still another embodiment, the method further includes shedding one or more of the plurality of circuits being supplied current according to the power distribution priority profile if the available current falls below the predetermined minimum threshold.

In yet another embodiment, the method further includes sequentially supplying current to individual devices in electrical communication with one of the plurality of circuits. The method still further includes measuring the current load of the one of the plurality of circuits after each individual device is supplied current. The method still further includes sequentially supplying current to the individual devices in electrical communication with the one of the plurality of circuits according to a device priority list. The device priority list is either an initial device priority list or a long-term device priority list.

In another aspect, the invention involves a method of providing backup power to each of a plurality of circuits in a building. The method includes a) supplying current to a first of the plurality of circuits only if available current is greater than a maximum current rating of the first of the plurality of circuits, b) measuring a current load of the first of the plurality of circuits after current has been supplied, c) subtracting the measured current load the first of the plurality of circuits from the available current, d) supplying current to a next of the plurality of circuits only if the available current is greater than a maximum current rating of the next of the plurality of circuits, e) measuring the current load of the next of the plurality of circuits after current has been supplied, f) subtracting the measured current load of the next of the plurality of circuits from the available current, and g) repeating steps d)-f) until each of the plurality of circuits is supplied current, the available current is not greater than a maximum current rating of any of the plurality of circuits not being supplied current, or the available current reaches a predetermined minimum threshold.

In one embodiment, the method further includes continuously measuring the current load of each of the plurality of circuits being supplied current.

In another embodiment, the method further includes shedding one or more of the plurality of circuits being supplied current according to the power distribution priority profile if the available current falls below the predetermined minimum threshold.

In still another embodiment, the method further includes executing steps a)-g) according to a power distribution priority profile. The power distribution priority profile is either an initial power distribution priority profile or a long-term power distribution priority profile. Current is supplied to the plurality of circuits according to the initial power distribution priority profile for a time period of 15-20 minutes following a loss of main power. Current is supplied to the plurality of circuits according to the long-term power distribution priority profile after the time period 15-20 minutes elapses and until main power is restored.

In still another aspect, the invention involves a method of providing backup power to a building. The method includes providing a generator configured for providing electrical power to each of a plurality of circuits, and providing a plurality of computer controlled circuit switches. Each of the plurality of computer controlled circuit switches is in electrical communication with the generator and a respective one of the plurality of circuits. Each of the plurality of computer controlled circuit switches is configured for selectively enabling or disabling electrical communication between the generator and the respective one of the plurality of circuits. The method further includes providing a plurality of current sensors. Each of the plurality of current sensors is associated with a respective one of the plurality of computer controlled circuit switches, and is configured for measuring a current load of the respective one of the plurality of circuits. The method further includes providing a switch controller in communication with each of the plurality of computer controlled circuit switches and each of the plurality of current sensors. The switch controller is configured for controlling each of the plurality of computer controlled circuit switches based on the measured current loads of the respective ones of the plurality of circuits and according to a power distribution priority profile.

In one embodiment, the power distribution priority profile includes the order in which each of the plurality of computer controlled circuit switches enables electrical communication between the generator and the respective one of the plurality of circuits.

In another embodiment, the method further includes providing a plurality of computer controlled device switches in electrical communication with one of the plurality of circuits. Each of the computer controlled device switches is configured for selectively enabling or disabling electrical communication between the generator and a connected device.

BRIEF DESCRIPTION OF DRAWINGS

The accompanying figures further illustrate the present invention.

The components in the drawings are not necessarily drawn to scale, emphasis instead being placed upon clearly illustrating the principles of the present invention. In the drawings, like reference numerals designate corresponding parts throughout the several views.

LIST OF REFERENCE NUMBERS FOR THE MAJOR ELEMENTS IN THE DRAWING

Figure 1:
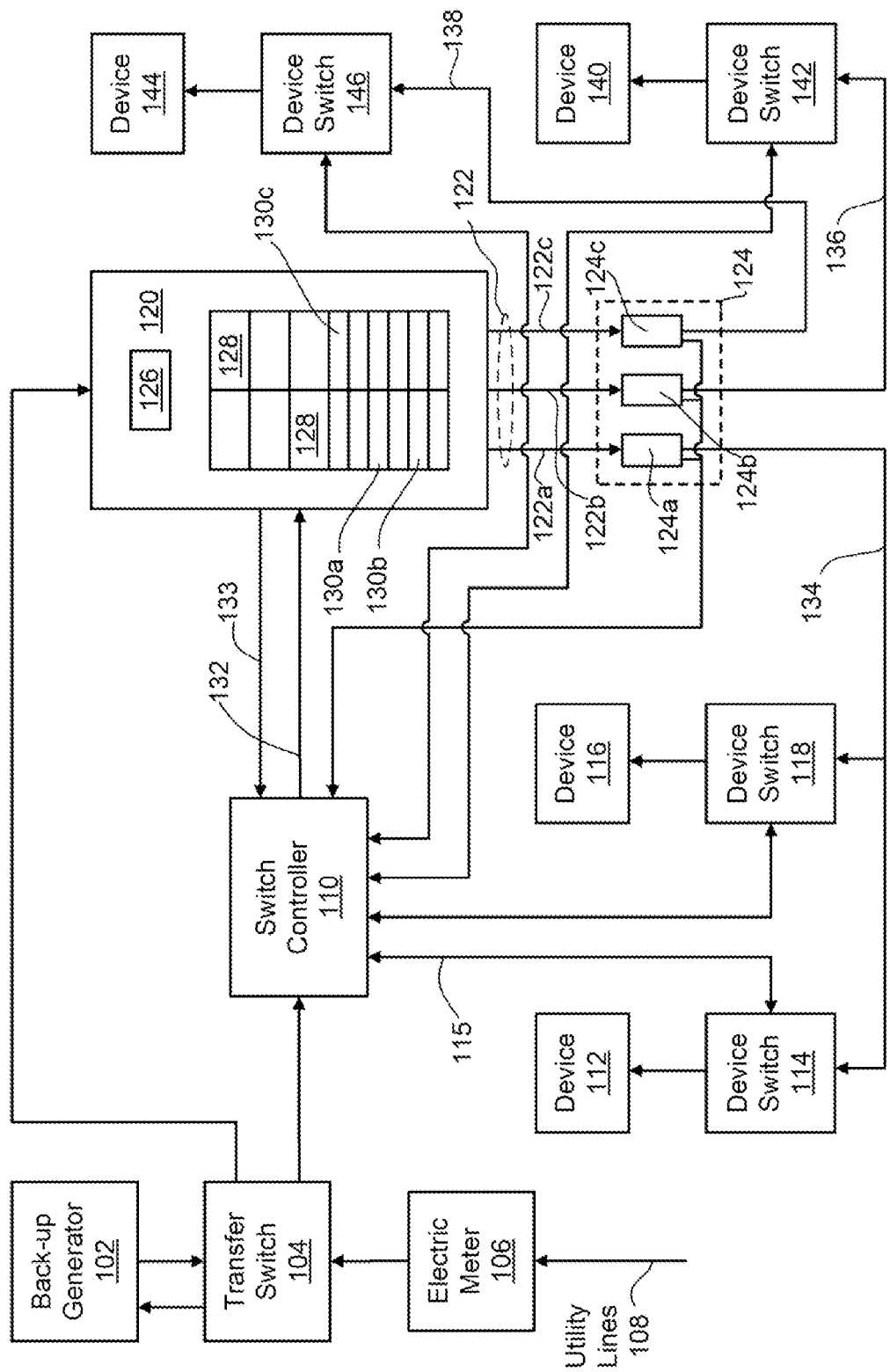
FIG. 1 is an illustrative block diagram of a backup power system, according to one embodiment of the invention.

The following is a list of the major elements in the drawings in numerical order.
102 backup generator
104 transfer switch 106 electric meter
108 utility lines
110 switch controller
112 device
114 computer controlled device switch
115 device switch control and status lines
116 device
118 computer controlled device switch
120 circuit breaker box
122a electrical circuit line from breaker (130a)
122b electrical circuit line from breaker (130b)
122c electrical circuit line from breaker (130c)
124a current sensor
124b current sensor
124c current sensor
126 main circuit breaker
128 computer controlled circuit breaker
130a computer controlled circuit breaker
130b computer controlled circuit breaker
130c computer controlled circuit breaker
132 breaker control lines
133 breaker status lines
134 electrical circuit line
136 electrical circuit line
138 electrical circuit line
140 device
142 computer controlled device switch
144 device
146 computer controlled device switch
202 processor
204 memory
206 switch control interface
208 current sensor interface
210 display
212 mass storage device
214 keyboard
216 mouse
300 initial power distribution priority profile configuration screen
301 initial power distribution priority profile configuration screen
302 initial power distribution priority profile
303 initial power distribution priority profile
304 initial priority profile selection drop down list
306 drop down box activation button
308 circuit name
310a-l breaker/switch/circuit selection drop down list
312 drop down box activation button
314 priority level
316a-l priority level selection drop down list
318 drop down box activation button
320 save profile as button
322 profile name entry field
324 connected devices
326a-l device list selection button
342 initial power distribution priority profile name
344 breaker/switch/circuit name
346 current rating
400 initial device priority list configuration screen
401 initial device priority list
402 circuit name section
404 circuit name field
405 circuit name
406 enabled
408 device name
410 priority level
412a-l check box
414a-l device name field
416 drop down box activation button
418a-l priority level selection drop down box
420 back to circuit list button
500 long-term power distribution priority list configuration screen
501 long-term power distribution priority list configuration screen
502 long-term power distribution priority profile
503 long-term power distribution priority profile
504 long-term priority profile selection drop down list
506 drop down box activation button
508 circuit name
510a-l breaker/switch/circuit selection drop down list
512 drop down box activation button
514 priority level
516a-l priority level selection drop down list
518 drop down box activation button
520 save profile as button
522 profile name entry field
524 connected devices
526a-l device list selection button
542 long-term power distribution priority profile name
544 breaker/switch/circuit name
546 current rating
600 long-term device priority list configuration screen
601 long-term device priority list
602 circuit name section
604 circuit name field
605 circuit name
606 enabled
608 device name
610 priority level
612a-l check box
614a-l device name field
616 drop down box activation button
618a-l priority level selection drop down box
620 back to circuit list button
700 power distribution management screen
702 initial power distribution priority profile button
704 current initial power distribution profile
706 initial power distribution profile name field
708 long-term power distribution priority profile button
710 current long-term power distribution profile
712 long-term power distribution profile name field
802 transfer switch breaks connection between power lines and breaker box
804 transfer switch transmits status signal to switch controller
806 transfer switch establishes connection between generator and breaker box
808 transfer switch transmits status signal to switch controller
810 switch controller disables all computer controlled breakers and device switches
812 switch controller determines the circuit intended to receive power
814 obtain maximum current rating for the breaker/switch/circuit
816 is the generator capable of supplying the required current?
818 Enable the respective computer controlled circuit breaker
820 bypass the breaker/switch/circuit
822 obtain a measurement of the current load of the powered circuit 824 subtract measured current load from generator supply current to obtain remaining available supply current
826 switch controller determines the next circuit intended to receive power
are there additional circuits?
828 obtain maximum current rating for the next breaker/switch/circuit
830 is the generator capable of supplying the required current?
832 bypass the breaker/switch/circuit
834 switch controller determines the device intended to receive power are there additional devices?
836 Enable the respective computer controlled device switch
838 obtain a measurement of the current load of the powered circuit
840 subtract measured current load from generator supply current to obtain remaining available supply current
842 is the generator capable of supplying the required current?
902 switch controller disables computer controlled breakers/switches that were enabled according to the initial power distribution priority profile
912 switch controller determines the circuit intended to receive power
914 obtain maximum current rating for the breaker/switch/circuit
916 is the generator capable of supplying the required current?
918 Enable the respective computer controlled circuit breaker
920 bypass the breaker/switch/circuit
922 obtain a measurement of the current load of the powered circuit
924 subtract measured current load from generator supply current to obtain remaining available supply current
926 switch controller determines the next circuit intended to receive power
are there additional circuits?
928 obtain maximum current rating for the next breaker/switch/circuit
930 is the generator capable of supplying the required current?
932 bypass the breaker/switch/circuit
834 switch controller determines the device intended to receive power are there additional devices?
936 Enable the respective computer controlled device switch
938 obtain a measurement of the current load of the powered circuit
940 subtract measured current load from generator supply current to obtain remaining available supply current
942 is the generator capable of supplying the required current?
1002 computer controlled circuit switches
1002a computer controlled circuit switch
1002b computer controlled circuit switch
1002c computer controlled circuit switch
1004 electrical circuit lines into circuit switches
1004a electrical circuit line into circuit switch
1004b electrical circuit line into circuit switch
1004c electrical circuit line into circuit switch
1006 electrical circuit lines into current sensors
1006a electrical circuit line into current sensor
1006b electrical circuit line into current sensor
1006c electrical circuit line into current sensor
1008 circuit breaker box
1010 master circuit breaker
1012 circuit breaker
1014a circuit breaker
1014b circuit breaker
1014c circuit breaker
1102 circuit breaker box
1104 circuit breaker
1106 circuit breaker
1108 circuit breaker
1109 circuit breaker
1110 device switch
1112 device
1114 computer controlled device switch
1115 device switch control and status lines
1116 device
1118 computer controlled device switch
1120 device
1122 electrical circuit line
1124 current sensor
1202a computer controlled circuit switch
1202b computer controlled circuit switch
1204 switch control lines
1206 switch status lines
1208 electrical circuit line
1210 electrical circuit line
1212a current sensor
1212b current sensor

DETAILED DESCRIPTION OF THE INVENTION

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to".

Mode(S) for Carrying out the Invention

The present invention involves a backup power system for a building (e.g., commercial, residential, government, or any other fixed or mobile structure that receives/requires electrical power) that selectively provides power to particular circuits according to a power distribution priority profile. Power is applied sequentially to each particular circuit on the power distribution priority list depending on the measured current loads of the particular circuits to which power has already been applied.

Referring to FIG. 1, in one embodiment, a block diagram of a backup power system is shown. The backup power system includes a backup generator (generator) 102, a transfer switch 104, a switch controller 110, current sensors (generally 124), and remote (computer) controlled device switches 114, 118, 142, 146. The backup power system also includes main circuit breaker 126, and remote (i.e., computer) controlled circuit breakers (i.e., switches) 128, 130a, 130b, 130c, which are disposed in a breaker box 120.

The transfer switch 104 is in electrical communication with utility lines 108 via an electric meter 106. The transfer switch 104 is also in communication with the generator 102 and the switch controller 110. During normal operation, when electrical power is available via the power lines 108, the transfer switch 104 connects the power lines 108 to the breaker box 120. When power from the power lines 108 is interrupted (e.g., down power lines, blown/damaged local transformer), the transfer switch 104 detects the loss of power from the power lines 108 and breaks the connection between the power lines 108 and the breaker box 120. The transfer switch 104 then establishes a connection between the generator 102 and the breaker box 120, and turns on the generator 102, which then provides electrical power to the breakers in the breaker box 120. The transfer switch 104 also transmits status signals to the switch controller 110 to inform the switch controller 110 either that power from the power lines 108 has been interrupted and that the generator 102 is now supplying power, or that power from the power lines 108 is functioning properly.

The switch controller 110 provides switch control signals 132 (e.g., open or close breaker/switch) to the computer controlled breakers 128, 130a, 130b, 130c, which replace conventional breakers typically disposed in the breaker box 120. The switch controller 110 receives status signals 133 (e.g., breakers/switches open or closed) from the breakers 128, 130a, 130b, 130c. The switch controller 110 also provides control signals (e.g., open or close) to, and receives status signals (e.g., switch open or closed) from, the device switches 114, 118, 142, 146 via lines 115. The switch controller 110 is described in more detail below with respect to FIG. 2.

The computer controlled device switches 114, 118, 142, 146 control devices 112, 116, 140, and 144, respectively. In various embodiments, the devices 112, 116, 140, and 144 include, but are not limited to, one or more lights, one or more outlets, one or more hardwired machines, HVAC equipment, water pumps/systems, telephone systems, elevators, emergency systems, and security systems, and/or any other electrical device or system that is conceivably available in a building.

A plurality of individual electrical circuit lines (generally 122) originate and extend from the breaker box 120. Each of the individual electrical circuit lines 122 is connected to a separate current sensor (generally 124). In the exemplary embodiment shown in FIG. 1, only three computer controlled circuits are shown. Specifically, circuit line 122a (from breaker 130a) connects to current sensor 124a, circuit line 122b (from breaker 130b) connects to current sensor 124b, and circuit line 122c (from breaker 130c) connects to current sensor 124c.

In other embodiments, more or less computer controlled circuits (with current sensors) are included. In a preferred embodiment, each of the circuits connected to the breaker box 120 is a computer controlled circuit. In other words, each of the breakers in the breaker box 120 is a computer controlled circuit breaker, and each computer controlled circuit breaker is connected to a separate current sensor. In still another embodiment, a single current sensor is electrically connected between the transfer switch 104 and the breaker box 120, and replaces the individual current sensors 124a, 124b, and 124c. This single current sensor continuously transmits the cumulative current load on the generator 102 to the switch controller 110.

Still referring to FIG. 1, the current sensor 124a is connected to (is part of) circuit 134, which includes device switches 114 and 118 and devices 112 and 116. The current sensor 124b connects to (is part of) circuit 136, which includes device switch 142 and device 140. The current sensor 124c connects to (is part of) circuit 138, which includes device switch 146 and device 144. Each current sensor 124a, 124b, 124c measures the current load of the respective one of the plurality of circuits 134, 136, 138 by methods known to those skilled in the art, and transmits/reports the measured current load to the switch controller 110.

Each breaker 130a, 130b, 130c controls current flow to the respective circuit 134, 136, 138. Each computer controlled device switch 114, 118, 146, and 142 controls current flow to the respective device 112, 116, 140, and 144. Based on the cumulative measured current loads of the powered circuits, the switch controller 110 determines whether or not to enable (turn on) the computer controlled breaker for the next circuit or the device switch for the next device in the power distribution priority list.

Figure 2:
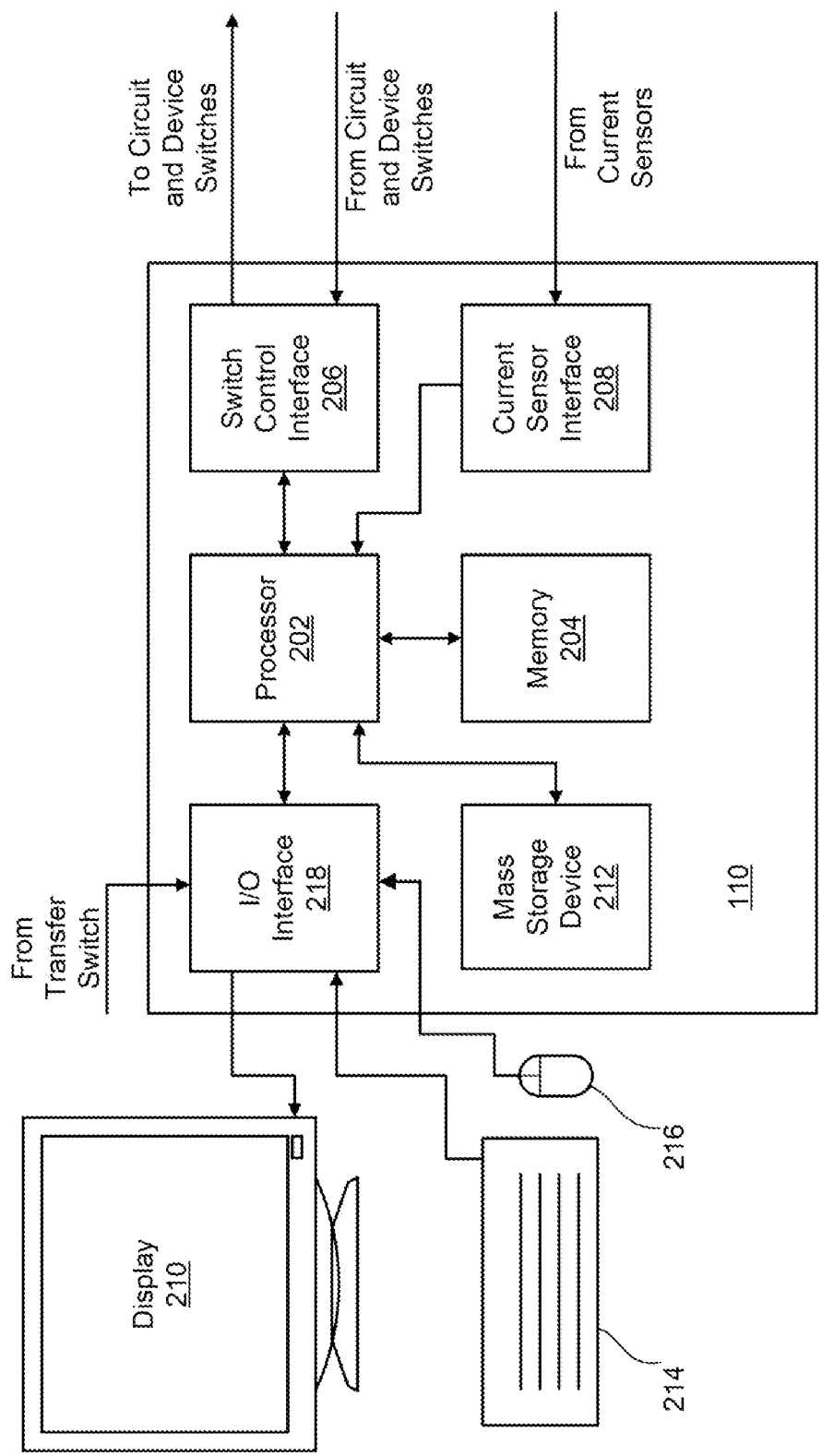
FIG. 2 is an illustrative block diagram of a switch controller, according to one embodiment of the invention.

Referring to FIG. 2, in one embodiment, the switch controller 110 includes a processor 202, a memory 204, a switch control signal interface 206, a current sensor interface 208, mass storage device (e.g., hard disk) 210, and an I/O interface 218.

The switch control signal interface 206 is digital I/O chip or board in communication with the processor 202 and transmits digital control signals to, and receives digital status signals from, the remote (computer) controlled breakers 128, 130a, 130b, 130c, and the computer controlled device switches 114, 118, 146, 142. The current sensor interface 208 is also a digital I/O chip or board in communication with the processor 202 and receives digital status signals from the current sensors 124a, 124b, 124c. The I/O interface 218 is also a digital I/O chip or board in communication with the processor 202, and is also in communication with a display 210, a keyboard 212, and a mouse 214. The I/O interface 218 also receives the status signals from the transfer switch 104 that inform the switch controller 110 either that power from the power lines 108 has been interrupted and that the generator 102 is now supplying power, or that power from the power lines 108 is functioning properly.

A switch control program is stored on the hard disk 210 and executes on the processor 202. The switch control program includes a user interface that allows an operator to set up various power distribution priority lists (priority lists), which are also stored on the hard disk 210. The switch control program also includes code that enables the processor 202 to control and interface with various connected devices.

After one or more priority lists are created and stored, the processor 202 (executing the switch control program) loads the priority list(s) into memory 204, and then controls the various computer controlled breakers 130a, 130b, 130c and the computer controlled device switches 114, 118, 146, 142 to enable and disable power (via the switch control signal interface 206) according to the currently loaded power distribution priority list and in response to current load information received from the current sensors 124a, 124b, 124c. The switch control program is written in any appropriate computer language known to those skilled in the art.

In various embodiments, the switch controller 110 also includes a floppy disk drive, a CD/DVD drive, a LAN card, and any of the possible computer interface connections known to those skilled in the art, such as USB, Firewire, serial, and/or parallel connections, for example.

Figure 3A:
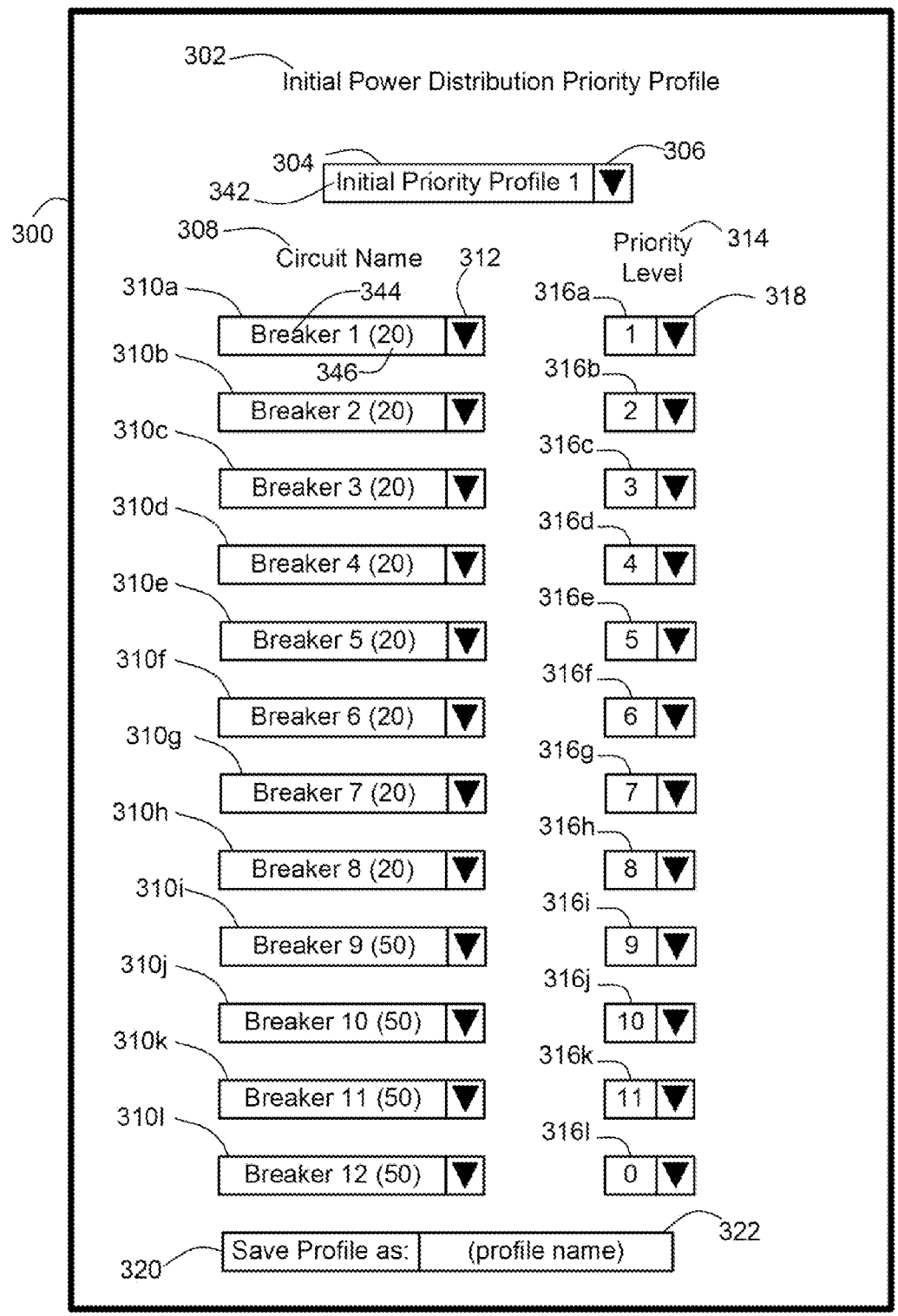
FIG. 3A is an illustrative initial power distribution priority list configuration screen, according to one embodiment of the invention.

Referring to FIG. 3A, in one embodiment, an illustrative initial power distribution priority profile configuration screen 300 is shown. The configuration screen 300, and other configuration screens described below, are graphical user interfaces that are displayed on the display 210 and are navigable using methods known to those skilled in the art, such as with the mouse 216 for clicking buttons, activating drop down menus, and selecting items from the drop down menus, and with the keyboard 214 for entering text in text entry fields.

The initial power distribution priority profile configuration screen 300 is used to configure/create an initial (short term) power distribution priority profile 302, which is a priority list of the building circuits and/or devices that will receive backup power initially after a loss of main power. The selected circuits and/or devices will receive backup power for only a short time (e.g., 15-20 minutes) so that people are not caught in dark, dangerous, or inconvenient places (e.g., elevator or windowless bathroom); so that particular machines can be properly shut down (e.g., computers); and/or so that certain machines can finish a particular task (e.g., manufacturing machines), for example. It should be noted that certain sensitive or important circuits and/or devices could also be connected to an uninterruptable power supply so that there is no power loss during the transition from utility line power to backup generator power.

The initial power distribution priority profile configuration screen 300 includes an initial power distribution priority profile drop down list 304, which is used to load a previously configured/saved initial power distribution priority profile. The desired initial power distribution priority profile name 342 is selected from the initial power distribution priority profile drop down list 304 by using drop down button 306. The initial power distribution priority profile configuration screen 300 further includes a circuit name column 308, a priority level column 314, a "save profile as" button 320, and a "profile name" text entry field 322.

The circuit name column 308 includes breaker/switch/circuit selection drop down lists 310a-l, which are activated by using respective drop down buttons 312. The drop down lists 310a-l each include a complete list of the names 344 of the computer controlled breakers (e.g., "Breaker 1") (see FIG. 1), or computer controlled switches (e.g., "Switch 1") (see FIG. 10), or the circuits connected to such computer controlled breakers or switches (e.g., "emergency lights"), which are controlled by, and report to, the switch controller 110. The drop down lists 310a-l each also include corresponding maximum current ratings/loads 346 for each of the listed breakers, switches, or circuits.

The priority level column 314 includes priority level selection drop down lists 316a-l, which are activated by using respective drop down buttons 318. The drop down lists 316a-l each include a list of priority levels. One of the priority levels in a particular drop down list 316a-l is assigned to the particular breaker/switch/circuit that was selected from the associated breaker/switch/circuit selection drop down list 310a-l.

If an operator configures/creates a new initial power distribution priority profile, the operator can save it to a new profile by entering the new profile name in the entry field 322 and pressing the "save profile as" button 320 with a mouse click. Similarly, if an operator edits an existing initial power distribution priority profile and wishes to save the edited profile, the operator can overwrite the existing profile by entering the existing profile name in the entry field 322 and pressing the "save profile as" button 320 with a mouse click. In the case of overwriting a profile, a message requesting confirmation will be displayed.

Still referring to the example shown in FIG. 3A, the initial power distribution priority profile 302 currently loaded is named "initial priority profile 1". According to this particular initial priority profile, the circuit "breaker 1" (max current rating of 20 amps) is assigned a priority level of "1"; the circuit "breaker 2" (max current rating of 20 amps) is assigned a priority level of "2"; the circuit "breaker 3" (max current rating of 20 amps) is assigned a priority level of "3"; the circuit "breaker 4" (max current rating of 20 amps) is assigned a priority level of "4"; the circuit "breaker 5" (max current rating of 20 amps) is assigned a priority level of "5"; the circuit "breaker 6" (max current rating of 20 amps) is assigned a priority level of "6"; the circuit "breaker 7" (max current rating of 20 amps) is assigned a priority level of "7"; the circuit "breaker 8" (max current rating of 20 amps) is assigned a priority level of "8"; the circuit "breaker 9" (max current rating of 50 amps) is assigned a priority level of "9"; the circuit "breaker 10" (max current rating of 50 amps) is assigned a priority level of "10"; the circuit "breaker 11" (max current rating of 50 amps) is assigned a priority level of "11"; and the circuit "breaker 12" (max current rating of 50 amps) is assigned a priority level of "12".

Consequently, shortly after power from utility lines is interrupted, the first circuit to receive power from the backup generator 102 is the circuit "breaker 1". Then, if the backup generator 102 is capable of supplying sufficient power (i.e., support the additional current load), the circuit "breaker 2" will next receive power. This same approach is used for the remaining circuits listed in the initial power distribution list 340. However, in the present example, because the circuit "breaker 12" has a priority level of "0", even if the backup generator 102 is still capable of supplying sufficient power after all the other circuits have been powered, "breaker 12" will not receive power.

In another embodiment, all circuits with a priority level of "1" will turn on immediately (i.e., always-on circuits) and all decision logic is bypassed. In this embodiment, it is the responsibility of the operator to ensure that the generator is capable of supplying enough power to handle all priority "1" circuits so that the generator is not overloaded.

Figure 3B:
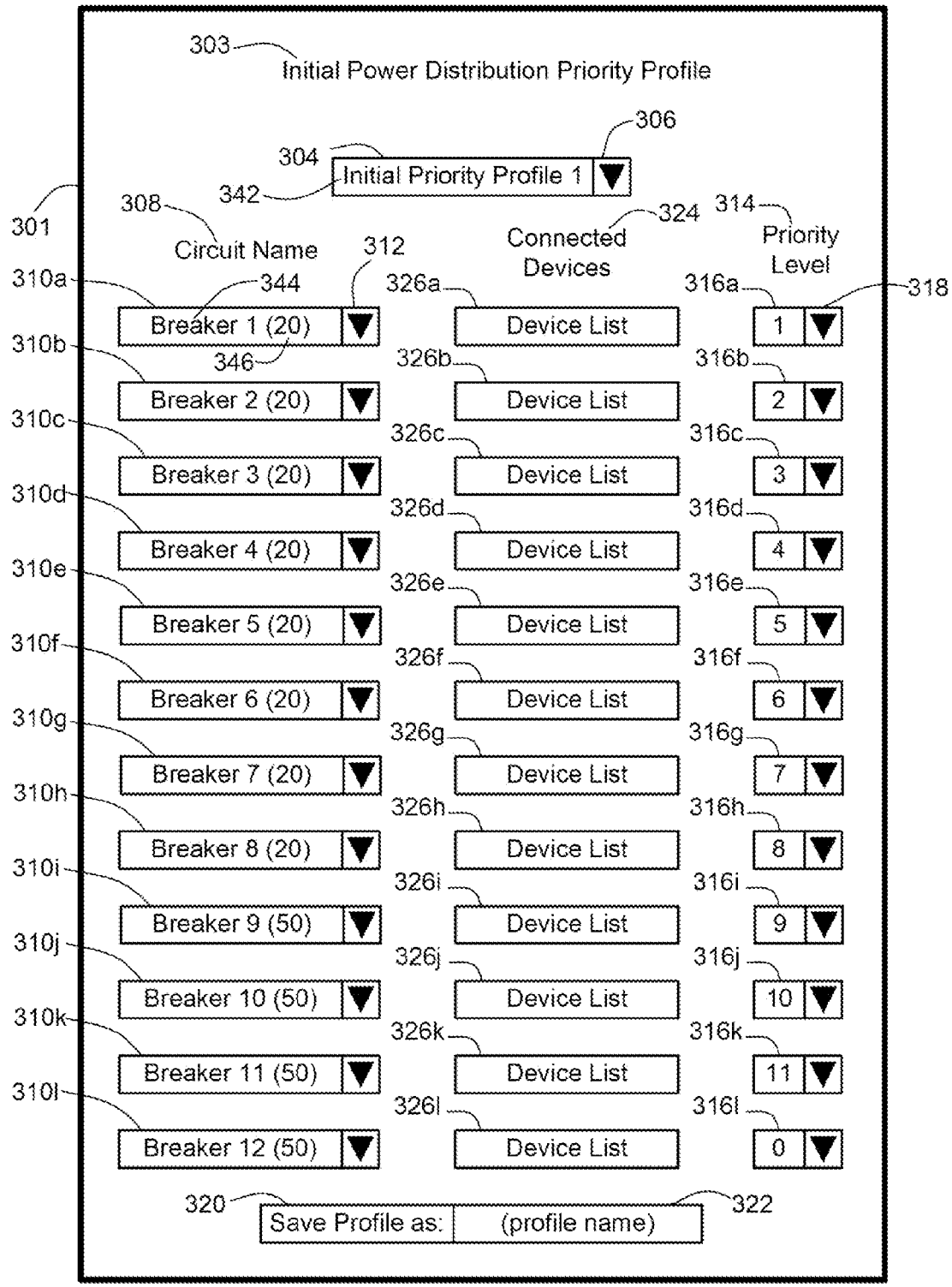
FIG. 3B is an illustrative initial power distribution priority list configuration screen, according to another embodiment of the invention.

Referring to FIG. 3B, in another embodiment, a different illustrative initial power distribution priority profile configuration screen 301 with an initial power distribution priority profile 303 is shown. This embodiment includes the same features as the embodiment shown in FIG. 3A with the addition of a connected devices column 324. The connected devices column 324 includes a respective device list button 326a-l for each of the circuits 310a-l. When an operator presses one of the device list buttons 326a-l, an initial device priority list configuration screen 400 (see FIG. 4) is displayed on the display 210. The device priority list configuration screen 400 shows a list 401 of the devices connected to the corresponding circuit (shown in the corresponding circuit selection drop down list 310a-l), and is discussed in detail below with respect to FIG. 4.

In one embodiment, each circuit listed in the circuit name column 308 is assigned only one priority level, and two or more circuits cannot share the same priority level. In other embodiments, a particular circuit can have more than one priority level, where the different priority levels are associated with providing power to different devices in the same circuit, and is discussed detail with respect to FIG. 4.

It should be noted that even though a particular circuit is assigned a priority level, and is intended to receive backup power, the particular circuit might still not receive backup power if one or more circuits that have higher priorities draw enough current to reach the maximum current that the backup generator can supply.

Figure 4:
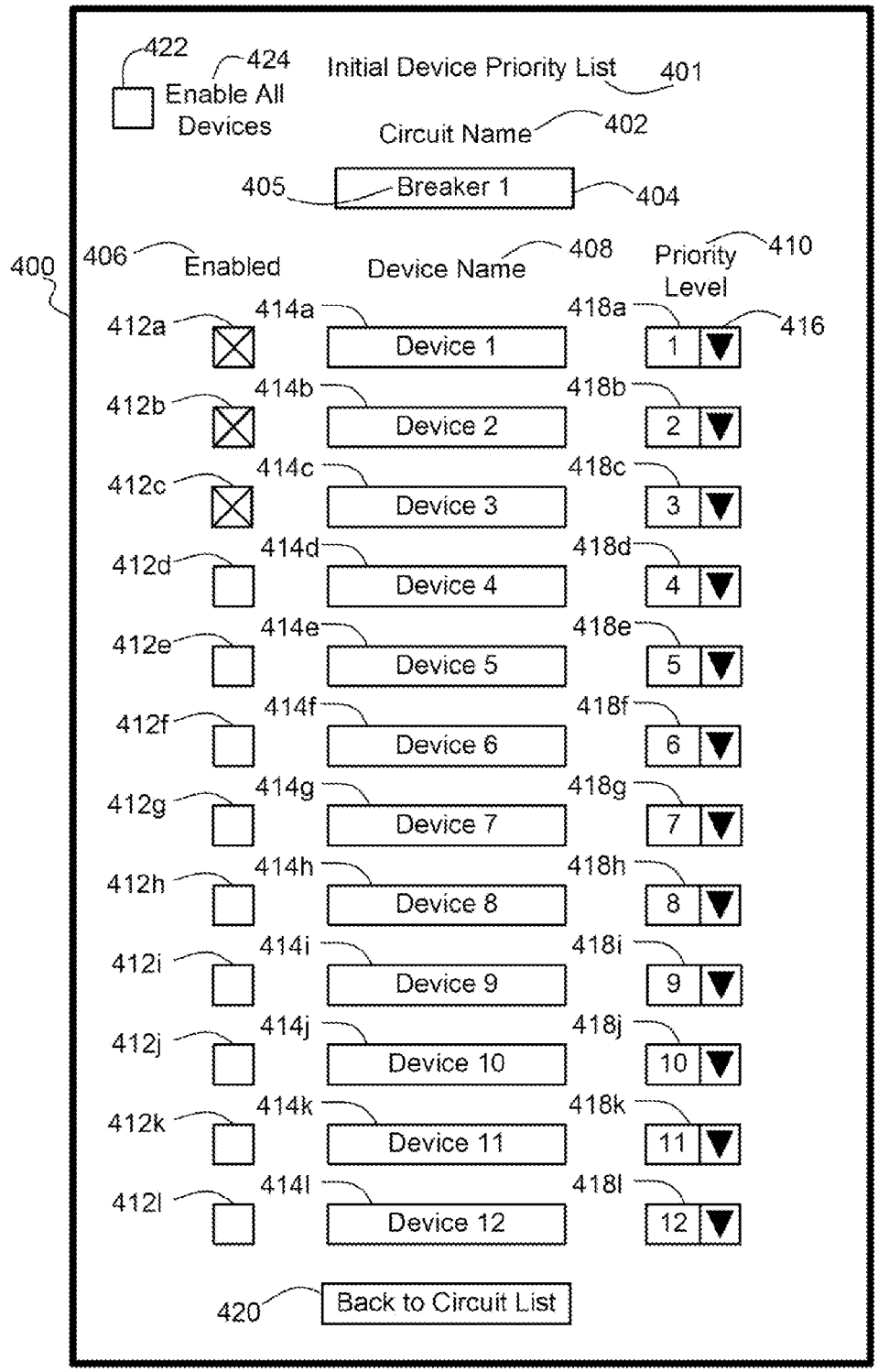
FIG. 4 is an illustrative initial device priority list, according to one embodiment of the invention.

Referring to FIG. 4, in one embodiment, an illustrative initial device priority list configuration screen 400 is shown. The initial device priority list configuration screen 400 is used to configure/create the initial device priority list 401, which is a list of the devices connected to a particular circuit that will receive backup power initially after a loss of main power. The screen 400 includes a circuit name section 402, which lists/displays in a circuit name field 404 the name 405 of the circuit to which the devices in the initial device priority list 401 are connected. The screen 400 also includes an enabled column 406, a device name column 408, a priority level column 410, an "enable all devices" option 424 with an associated check box 422, and a "back to circuit list" button 420.

The device name column 408 includes a name of each device 414a-l connected to the circuit listed in the circuit name field 404. The enabled column 406 includes a check box 412a-l associated with each device 414a-l. When a particular check box 412a-l is checked (i.e., includes an "x" therein, the corresponding device 414a-l is enabled and will receive power. Conversely, a device with a check box unchecked will not receive power. The priority level column 410 includes priority level selection drop down lists 418a-l, which are activated by using respective drop down buttons 416. The drop down lists 418a-l each include a list of priority levels. One of the priority levels in a particular drop down list 418a-l is assigned to the particular device 414a-l that was selected by checking the corresponding check box 412a-l.

In another embodiment, instead of enabling or disabling devices using check boxes 412a-l, a device is automatically enabled if the corresponding priority level is set to a number other than zero. If the corresponding priority level of a particular device is set to zero (0), that particular device will not receive backup power.

When the check box 422 for the enable all devices option 424 is checked, all devices listed in the device name column 408 receive power when the corresponding circuit 402 receives power. In this configuration, individual devices do not have separate priorities (i.e., all devices receive backup power, or none of the devices receive backup power).

When the operator wishes to return to the initial power distribution priority list configuration screen, the operator simply presses (via mouse) the "back to circuit list" button 420. The initial device priority list 401 for each circuit 405 is part of, and stored in, the initial power distribution priority profile 303.

Still referring to the example shown in FIG. 4, the circuit to which the devices in the initial device priority list 401 are connected is "breaker 1". According to this particular initial device priority list 401, the devices "device 1", "device 2", and "device 3" are enabled. The device "device 1" is assigned a priority level of "1"; the device "device 2" is assigned a priority level of "2"; and the device "device 3" is assigned a priority level of "3". The other devices on initial device priority list 401 are not enabled.

As mentioned above with respect to FIGS. 3A and 3B, shortly after power from utility lines is interrupted, the first circuit to receive power from the backup generator 102 is the circuit "breaker 1". However, the particular devices connected to the circuit "breaker 1" receive power according to the initial device priority list 401. Specifically, the first device to receive power is the device "device 1". Then, if the backup generator 102 is capable of supplying sufficient power (i.e., support the additional current load), the device "device 2" will next receive power. Then, if the backup generator 102 is yet still capable of supplying sufficient power (i.e., support the additional current load), the device "device 3" will next receive power. This same approach is used for any remaining enabled devices listed in the long-term device priority list 601.

It should be noted that even though a particular device is assigned a priority level, and is intended to receive backup power, the particular device may still not receive backup power if one or more circuits and/or one or more devices that have higher priorities draw enough current to reach the maximum current that the backup generator can supply.

Figure 5A:
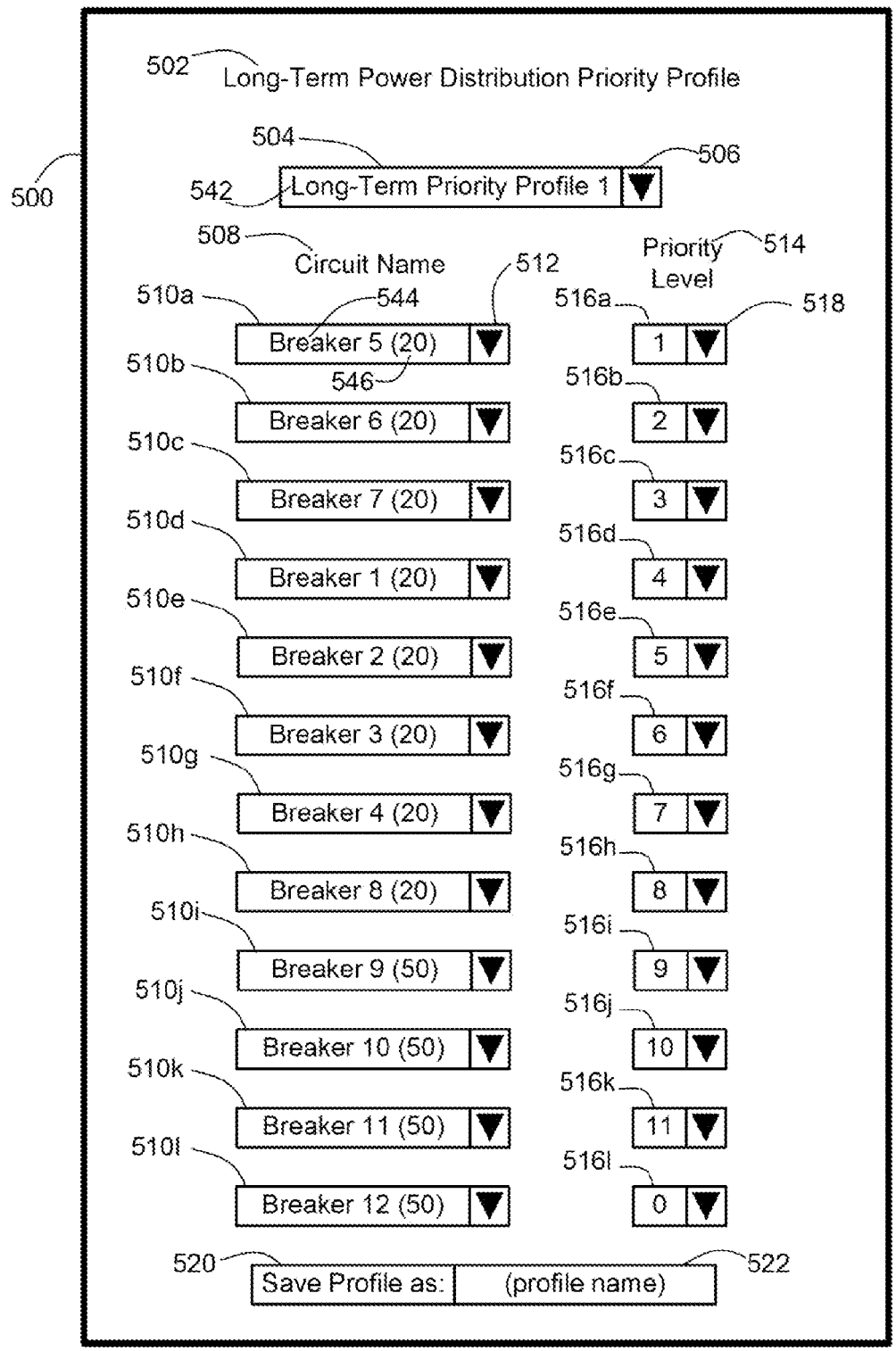
FIG. 5A is an illustrative long-term power distribution priority list configuration screen, according to one embodiment of the invention.

Referring to FIG. 5A, in one embodiment, an illustrative long-term power distribution priority profile configuration screen 500 is shown. The long-term power distribution priority list configuration screen 500 is used to configure/create a long-term power distribution priority profile 502, which is a priority list of the building circuits and/or devices that will receive backup power after the time for using the initial (short term) power distribution priority list has elapsed, and until main power is restored.

The long-term power distribution priority list configuration screen 500 includes a long-term power distribution priority profile drop down list 504, which is used to load previously configured/saved long-term power distribution priority profile. The desired long-term power distribution priority profile name 542 is selected from the long-term priority profile drop down list 504 by using the drop down button 506. The long-term power distribution priority profile configuration screen 500 further includes a circuit name column 508, a priority level column 514, "save profile as" button 520, and a "profile name" entry field 522.

The circuit name column 508 includes breaker/switch/circuit selection drop down lists 510a-l, which are activated by using respective drop down buttons 512. The drop down lists 510a-l each include a complete list of the names 544 of the computer controlled breakers (e.g., "Breaker 5"), or computer controlled switches (e.g., "Switch 1") or the circuits connected to such computer controlled breakers or switches (e.g., "emergency lights"), which are controlled by, and report to, the switch controller 110. The drop down lists 510a-l each also include corresponding maximum current ratings/loads 546 for each of the listed breakers, switches, or circuits.

The priority level column 514 includes priority level selection drop down lists 516a-l, which are activated by using respective drop down buttons 518. The drop down lists 516a-l each include a list of priority levels. One of the priority levels in a particular drop down list 516a-l is assigned to the particular breaker/switch/circuit that was selected from the associated breaker/switch/circuit selection drop down list 510a-l.

If an operator configures/creates a new long-term power distribution priority list, the operator can save it to a new profile by entering the new profile name in the entry field 522 and pressing the "save profile as" button 520 with a mouse click. Similarly, if an operator edits and existing initial power distribution priority profile and wishes to save the edited profile, the operator can overwrite the existing profile by entering the existing profile name in the entry field 522 and pressing the "save profile as" button 520 with a mouse click. In the case of overwriting a profile, a message requesting confirmation will be displayed.

Still referring to the example shown in FIG. 5A, the long-term priority profile 502 currently loaded is named "long-term priority profile 1". According to this particular long-term priority profile the circuit "breaker 5" (max current rating of 20 amps) is assigned a priority level of "1"; the circuit "breaker 6" (max current rating of 20 amps) is assigned a priority level of "2"; the circuit "breaker 7" (max current rating of 20 amps) is assigned a priority level of "3"; the circuit "breaker 1" (max current rating of 20 amps) is assigned a priority level of "4"; the circuit "breaker 2" (max current rating of 20 amps) is assigned a priority level of "5"; the circuit "breaker 3" (max current rating of 20 amps) is assigned a priority level of "6"; the circuit "breaker 4" (max current rating of 20 amps) is assigned a priority level of "7"; the circuit "breaker 8" (max current rating of 20 amps) is assigned a priority level of "8"; the circuit "breaker 9" (max current rating of 50 amps) is assigned a priority level of "9"; the circuit "breaker 10" (max current rating of 50 amps) is assigned a priority level of "10"; the circuit "breaker 11" (max current rating of 50 amps) is assigned a priority level of "11"; and the circuit "breaker 12" (max current rating of 50 amps) is assigned a priority level of "12".

Consequently, shortly after power from utility lines is interrupted, the first circuit to receive power from the backup generator 102 is the circuit "breaker 5". Then, if the backup generator 102 is capable of supplying sufficient power (i.e., support the additional current load), the circuit "breaker 6" will next receive power. This same approach is used for the remaining circuits listed in the initial power distribution list 340. However, in the present example, because the circuit "breaker 12" has a priority level of "0", even if the backup generator 102 is still capable of supplying sufficient power after all the other circuits have been powered, "breaker 12" will not receive power.

In another embodiment, all circuits with a priority level of "1" will turn on immediately (i.e., always-on circuits) and all decision logic is bypassed. In this embodiment, it is the responsibility of the operator to ensure that the generator is capable of supplying enough power to handle all priority "1" circuits so that the generator is not overloaded.

Figure 5B:
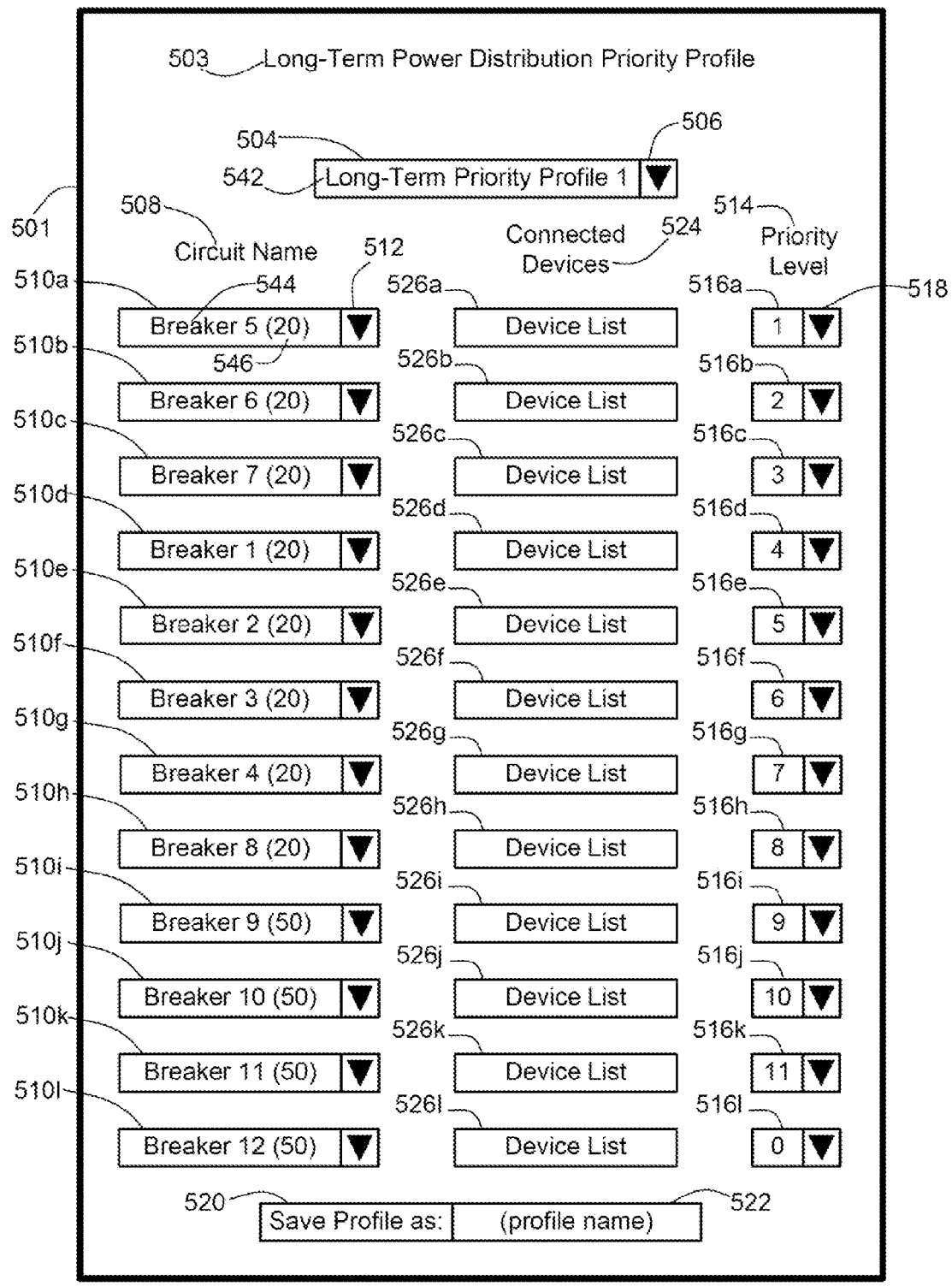
FIG. 5B is an illustrative long-term power distribution priority list configuration screen, according to another embodiment of the invention.

Referring to FIG. 5B, in another embodiment, a different illustrative long-term power distribution priority list configuration screen 501 with a long-term power distribution priority profile 503 is shown. This embodiment includes the same features as the embodiment shown in FIG. 5A with the addition of a connected devices column 524. The connected devices column 524 includes a respective device list button 526a-l for each of the circuits 510a-l. When an operator presses one of the device list buttons 526a-l, a device priority list configuration screen 600 (see FIG. 6) is displayed on the display 210. The device priority list configuration screen 600 shows a list of the devices connected to the corresponding circuit (shown in the corresponding circuit selection drop down list 510a-l), and is discussed in detail below with respect to FIG. 6.

Similar to that described with respect to FIGS. 3A, 3B, and 4, in one embodiment, each circuit listed in the circuit name column 508 is assigned only one priority level, and two or more circuits cannot share the same priority level. In other embodiments, a particular circuit listed in the circuit name column 508 can have more than one priority level, where the different priority levels are associated with providing power to different devices in the same circuit (see FIG. 6).

It should be noted that even though a particular circuit is assigned a priority level, and is intended to receive backup power, the particular circuit might still not receive backup power if one or more circuits that have higher priorities draw enough current to reach the maximum current that the backup generator can supply.

Figure 6:
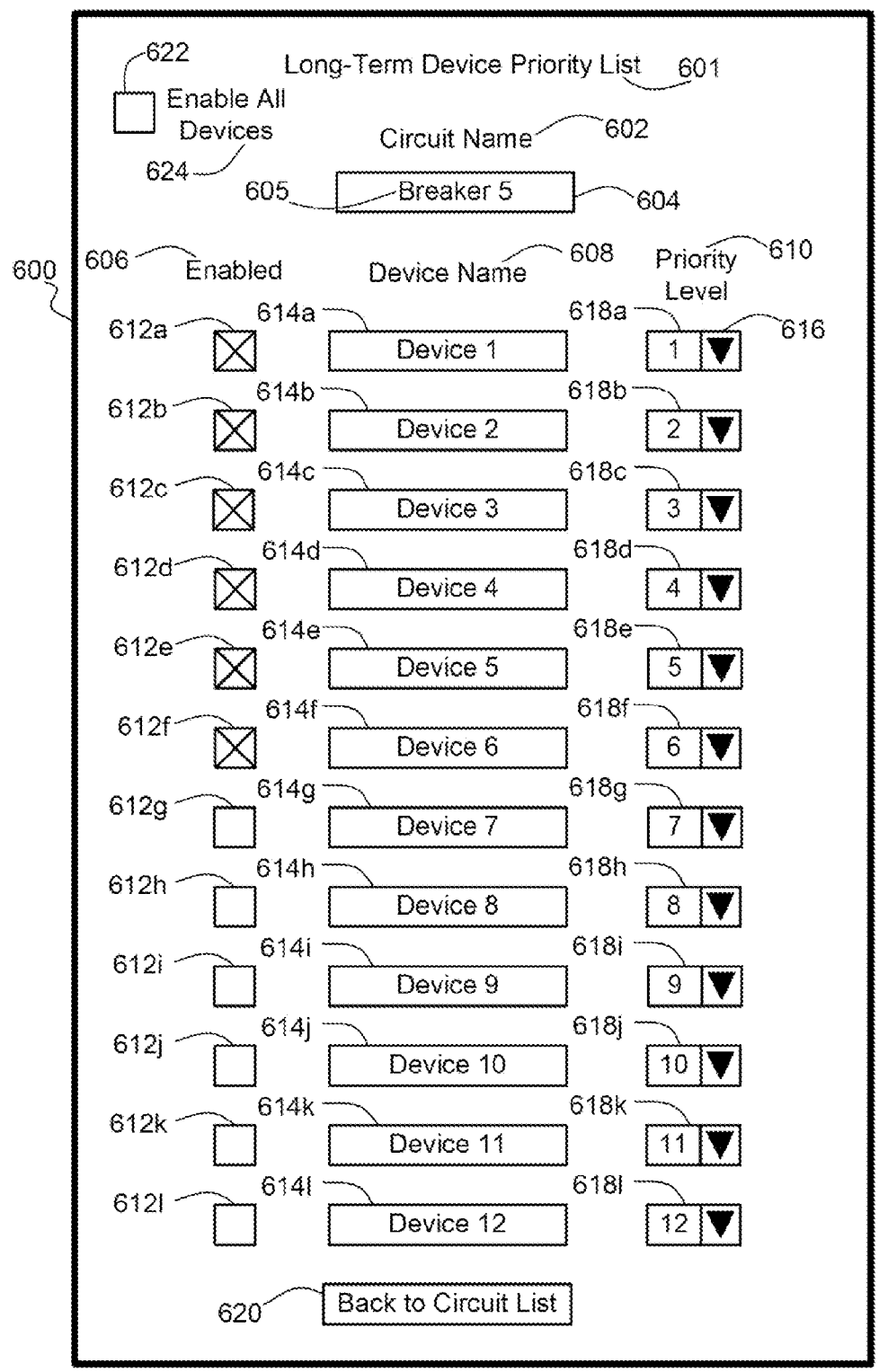
FIG. 6 is an illustrative long-term device priority list, according to one embodiment of the invention.

Referring to FIG. 6, in one embodiment, an illustrative long-term device priority list configuration screen 600 is shown. The long-term device priority list configuration screen 600 is used to configure/create a long-term device priority list 601, which is a list of the devices connected to a particular circuit that will receive backup power after the time for using the initial (short term) power distribution priority list has elapsed, and until main power is restored. The screen 600 includes a circuit name section 602, which lists/displays in a circuit name field 604 the name 505 of the circuit to which the devices in the long-term device priority list 601 are connected. The screen 600 also includes an enabled column 606, a device name column 608, a priority level column 610, an "enable all devices" option 624 with an associated check box 622, and a "back to circuit list" button 620.

The device name column 608 includes a name of each device 614a-l connected to the circuit listed in the circuit name field 604. The enabled column 606 includes a check box 612a-l associated with each device 614a-l. When a particular check box 612a-l is checked (i.e., includes an "x" therein, the corresponding device 614a-l is enabled and will receive power. Conversely, a device with a check box unchecked will not receive power. The priority level column 610 includes priority level selection drop down lists 618a-l, which are activated by using respective drop down buttons 616. The drop down lists 618a-l each include a list of priority levels. One of the priority levels in a particular drop down list 618a-l is assigned to the particular device 614a-l that was selected by checking the corresponding check box 612a-l.

In another embodiment, instead of enabling or disabling devices using check boxes 612a-l, a device is automatically enabled if the corresponding priority level is set to a number other than zero. If the corresponding priority level of a particular device is set to zero (0), that particular device will not receive backup power.

When the check box 622 for the enable all devices option 624 is checked, all devices listed in the device name column 408 receive power when the corresponding circuit 602 receives power. In this configuration, individual devices do not have separate priorities (i.e., all devices receive backup power, or none of the devices receive backup power).

When the operator wishes to return to the initial power distribution priority list configuration screen, the operator simply presses (via mouse) the "back to circuit list" button 620. The initial device priority list 501 for each circuit 605 is part of, and stored in, the long-term power distribution priority profile 503.

Still referring to the example shown in FIG. 6, the circuit to which the devices in the long-term device priority list 601 are connected is "breaker 5". According to this particular long-term device priority list 601, the devices "device 1", "device 2", "device 3", "device 4", "device 5", and "device 6" are enabled. The device "device 1" is assigned a priority level of "1"; the device "device 2" is assigned a priority level of "2"; the device "device 3" is assigned a priority level of "3"; the device "device 4" is assigned a priority level of "4"; the device "device 5" is assigned a priority level of "5"; and the device "device 6" is assigned a priority level of "6". The other devices on long-term device priority list 601 are not enabled.

As mentioned above with respect to FIGS. 5A and 5B, shortly after power from utility lines is interrupted, the first circuit to receive power from the backup generator 102 is the circuit "breaker 5". However, the particular devices connected to the circuit "breaker 5" receive power according to the long-term device priority list 601. Specifically, the first device to receive power is the device "device 1". Then, if the backup generator 102 is capable of supplying sufficient power (i.e., support the additional current load), the device "device 2" will next receive power. This same approach is used for the remaining enabled devices listed in the long-term device priority list 601.

It should be noted that even though a particular device is assigned a priority level, and is intended to receive backup power, the particular device may still not receive backup power if one or more circuits and/or one or more devices that have higher priorities draw enough current to reach the maximum current that the backup generator can supply.

In other embodiments, certain devices, such as emergency lights or life support equipment, for example, are listed on both the initial power distribution priority profile 302, 303 and the long-term power distribution list 502, 503.

Figure 7:
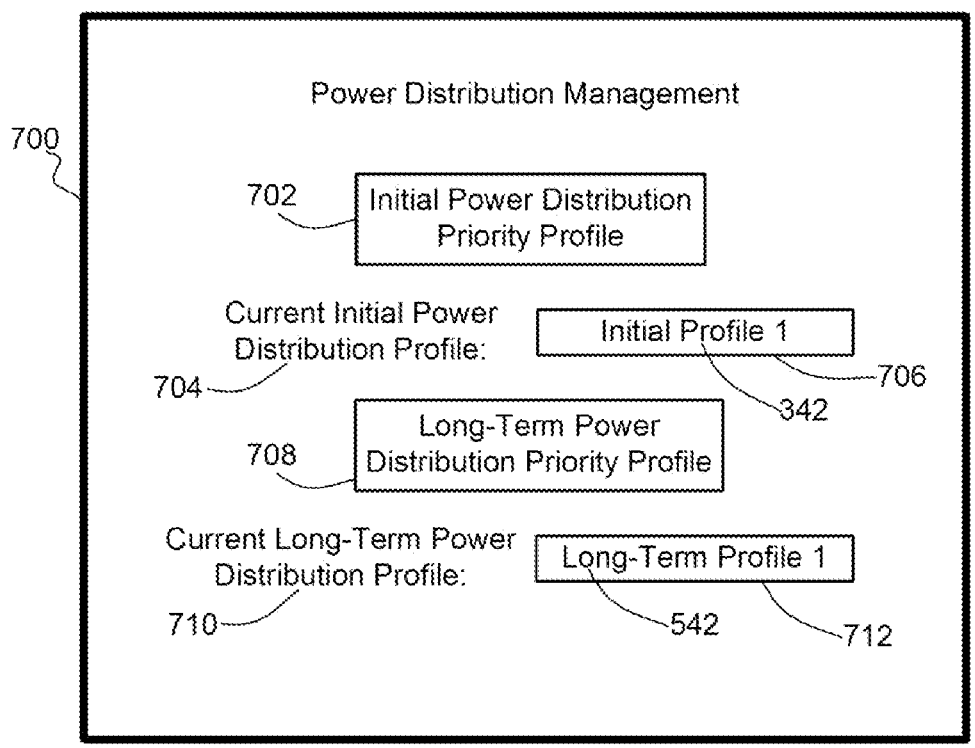
FIG. 7 is an illustrative power distribution management screen, according to one embodiment of the invention.

Referring to FIG. 7, in one embodiment, a power distribution management screen 700 is shown. The screen 700 includes an initial power distribution priority profile button 702, a current power distribution initial profile section 704, an initial power distribution profile name field 706, a long-term power distribution priority profile button 708, a current long-term power distribution profile section 710, and a long-term power distribution profile name field 712.

The initial power distribution priority profile button 702, when pressed, causes the initial power distribution priority profile configuration screen 300, 301 to be displayed. The long-term power distribution priority profile button 708, when pressed, causes the long-term power distribution priority profile configuration screen 500, 501 to be displayed.

The current initial power distribution profile section 704 lists/displays the name 342 of the currently loaded initial power distribution profile in the initial profile name field 706. The current long-term power distribution profile section 710 lists/displays in the name 542 of the currently loaded long-term power distribution profile in the long term power distribution profile name field 712.

In other embodiments, the initial and long-term power distribution priority profiles are configured according to the time of day and/or the time year. For example, the initial and long-term power distribution priority profiles would include supplying power to parking lot lights only at night. Further, the initial and long-term power distribution priority profiles would include supplying power to the heating system during the winter months and supplying power to the air conditioning system during the summer months only during work hours.

In still another embodiment, the initial and long-term power distribution priority profiles are configurable in real time according to the various building occupants' needs. For example, assume a particular computer is listed in the initial power distribution priority profile, and will at least receive power for 15-20 minutes after a utility line power failure so that data/work can be saved and the computer can be properly shut down. Further, assume that this particular computer is not included in the long-term power distribution priority profile. Still further assume that at the time of a utility line power failure, the particular computer is processing important data and cannot be shut down. In this situation, the computer operator can request that the particular computer be added to the long-term power distribution priority profile so that the particular computer will continue to receive power during the utility line power outage, and thus be able to continue/complete the data processing.

The backup power system operator need only edit/configure the long-term power distribution priority profile (as described above) to include the particular circuit that includes the particular computer. Alternatively, if the particular circuit that includes the particular computer is already included in the long-term power distribution priority profile, the operator need only enable the particular computer via the long-term device priority list (see FIG. 6).

Figure 8A:
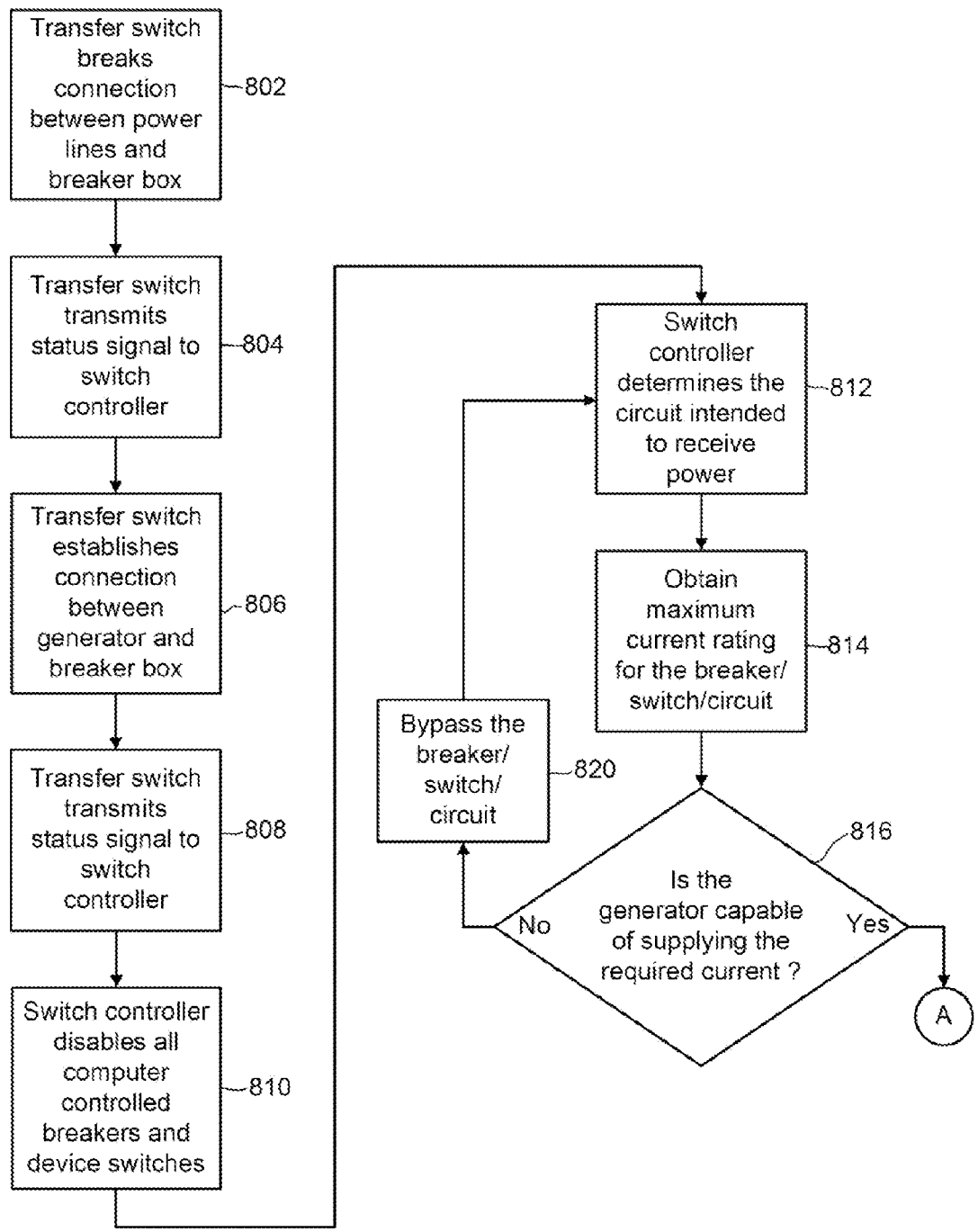
FIGS. 8A-8C are illustrative flow diagrams of the operation of the backup power system of FIG. 1 using an initial power distribution priority profile, according to one embodiment of the invention.
Figure 8B:
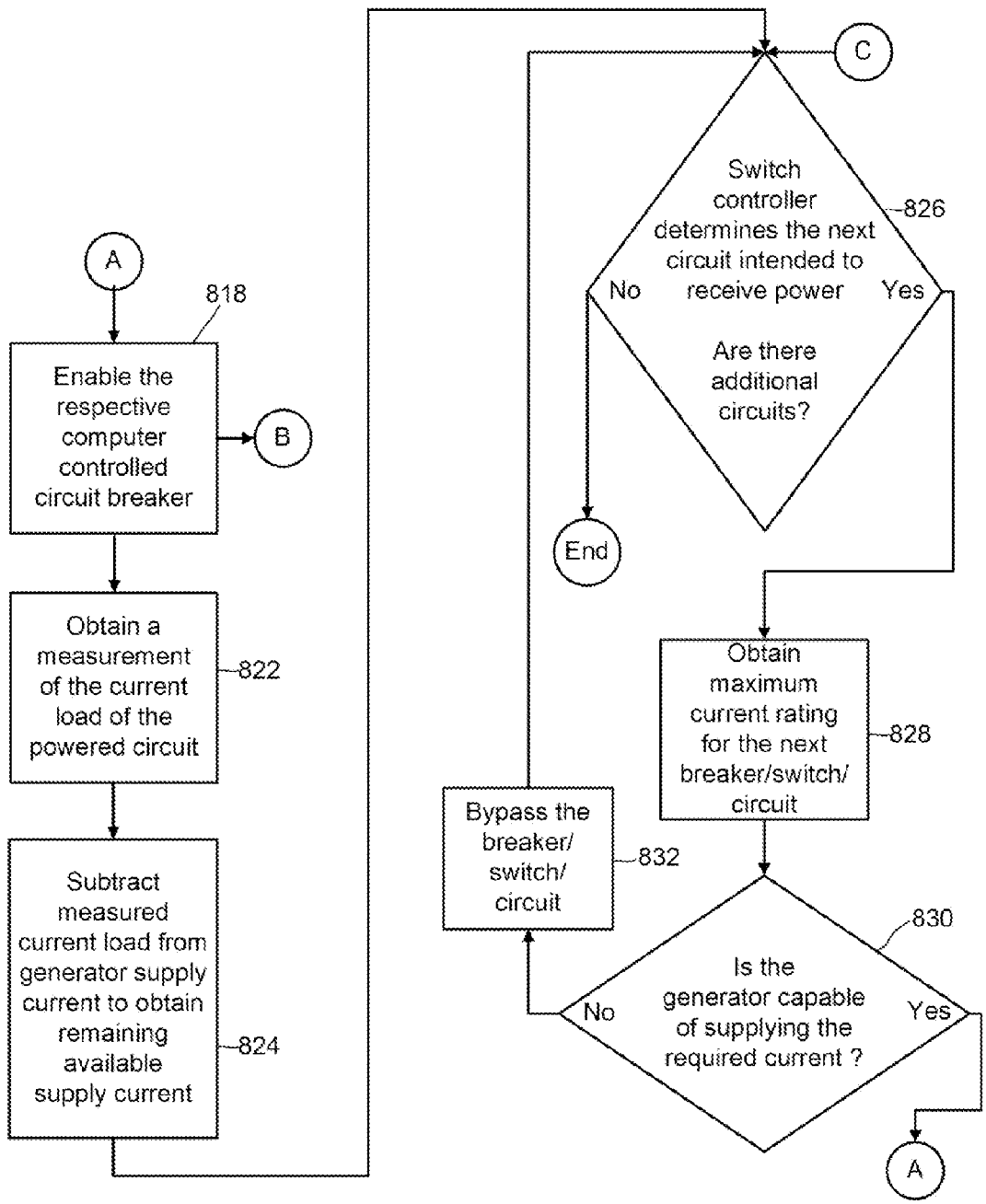

Referring to FIGS. 1 and 8A-8B, in one embodiment, operation of the complete backup power system using an initial power distribution priority profile is described. As mentioned above, when power from the power lines 108 is interrupted, the transfer switch 104 detects the loss of power from the power lines 108 and breaks the connection between the power lines 108 and the breaker box 120 (Step 802). The transfer switch 104 also transmits a status signal to the switch controller 110 that power from the power lines has been interrupted (Step 804). The transfer switch 104 then establishes a connection between the generator 102 and the breaker box 120, and turns on the generator 102, which then provides electrical power to the breakers in the breaker box 120 (Step 806). The transfer switch 104 then transmits status signals to the switch controller 110 to inform the switch controller 110 that the generator 102 is now supplying power (Step 808).

Under normal operation (i.e., when power is provided over the utility lines 108), the switch controller 110 keeps all the connected computer controlled circuit breakers in the breaker box 120 (and computer controlled device switches) closed/enabled so that all building circuits receive power. However, when the switch controller 110 receives the status signal from the transfer switch 104 that power from the power lines 108 has been interrupted, the switch controller 110 opens/disables all the connected computer controlled circuit breakers in the breaker box 120 (and disables all computer controlled device switches) (Step 810).

The switch controller 110 next consults the currently selected initial power distribution priority profile 342 (see FIGS. 3A, 3B) to determine which unpowered building circuit is intended to receive power (Step 812). More specifically, during a first pass, the unpowered circuit with the highest priority listed in the priority profile 342 is intended to receive power first. During a second pass, the next unpowered circuit with the next highest priority level listed in the priority profile 342 is intended to receive power second, and so on.

The generator 102 has a particular maximum current load rating (e.g., 200 A). This is the maximum current that the generator 102 can safely supply to the building circuits. Each of the building circuits has a maximum current load, which is determined by the particular circuit breaker connected thereto. For example, a particular circuit breaker rated for 20 A will allow up to a 20 A load before tripping. However, the actual load on the 20 A breaker may never reach 20 A.

The switch controller 110 obtains from the initial power distribution priority profile the maximum current rating (e.g., 20 A) for the first breaker/switch/circuit (or the next if the first has been bypassed) listed in the profile (e.g., "breaker 1", which is the circuit with a priority level of "1", FIGS. 3A, 3B) (Step 814). The switch controller 110 compares the maximum generator supply current with the maximum current rating of the first breaker/switch/circuit to determine if the generator 102 is capable of supplying the required current (i.e., support the current load of the circuit) (Step 816).

In other words, the switch controller 110 subtracts the maximum current rating (i.e., load) of the first breaker/switch/circuit from the maximum generator supply current. In one embodiment, the difference between these values must be greater than or equal to twenty percent of the maximum generator supply current (without a load). If the difference is less than twenty percent of the maximum generator supply current, the generator is deemed not capable of supporting the additional current load. Twenty percent of the maximum generator supply current is a safety margin in case one or more powered circuits draw more current than initially measured by the current sensors. In other embodiments, a smaller or larger safety margin is used.

If the generator 102 is capable of supplying the required current, the switch controller 110 enables the respective computer controlled circuit breaker (e.g., breaker 130a, FIG. 1) so that the associated circuit (e.g., circuit 134, FIG. 1) receives power (Step 818).

If the generator 102 is not capable of supplying the required current, the switch controller 110 does not enable the respective computer controlled circuit breaker (i.e., bypasses this particular circuit breaker), and the associated circuit does not receive power (Step 820). The switch controller 110 again consults the currently selected initial power distribution priority profile 342 to determine which unpowered building circuit is intended to receive power next (Step 812). The switch controller 110 then repeats Steps 814 and 816.

After Step 818, the switch controller 110 obtains a measurement of the actual current load of the first powered circuit (e.g., circuit 134, FIG. 1) from the associated current sensor (e.g., current sensor 124*a*, FIG. 1) (Step 822). The switch controller 110 then subtracts this current load measurement from the maximum generator supply current to obtain the actual remaining available generator supply current (Step 824). This remaining available generator supply current is the current that can be supplied to additional building circuits listed in the initial power distribution priority profile.

After step 824, the switch controller 110 again consults the initial power distribution priority profile 342 to determine the next unpowered building circuit that is intended to receive power (Step 826). If there are no more circuits intended to receive power, the process ends. If there are additional circuits intended to receive power, the switch controller 110 next obtains from the initial power distribution priority profile the maximum current rating for the next breaker/switch/circuit listed in the profile (e.g., "breaker 2", which is the circuit with a priority level of "2", FIGS. 3A, 3B) (Step 828). The switch controller 110 compares the available generator supply current (from Step 824) with the maximum current rating of the next breaker/switch/circuit to determine if the generator 102 is capable of supplying the required current (Step 830).

If the generator 102 is capable of supplying the required current, the switch controller 110 enables the respective computer controlled circuit breaker (e.g., breaker 130*b*, FIG. 1) so that the associated circuit (e.g., circuit 136, FIG. 1) receives power (Step 818). The switch controller 110 then again obtains a measurement of the actual current load of the second powered circuit (circuit 136) from the associated current sensor (e.g., current sensor 124*b*, FIG. 1) (Step 822), and subtracts this current load measurement from the remaining available generator supply current (Step 824) to obtain the new (now updated) actual remaining available generator supply current. The switch controller 110 then repeats steps 826, 828, and 830 as required.

If, however, the generator 102 is not capable of supplying the current required by the particular circuit, the switch controller 110 does not enable the respective computer controlled circuit breaker, and the associated circuit does not receive power (Step 832). The switch controller then repeats step 826. If there are no more circuits intended to receive power, the process ends. If there are additional circuits intended to receive power, the switch controller repeats steps 828 and 830.

The switch controller 110 repeats the above steps for the next breaker/switch/circuit listed in the initial power distribution priority profile until all the listed circuits have been either enabled or bypassed. For example, assume that after the switch controller 110 enables several circuits, the generator is capable of supplying only twenty-five more amps (while maintaining a twenty percent safety margin). Then assume that the next two circuits listed in the priority profile have maximum current load ratings of 40 A and 20 A, respectively. In this case, the 40 A circuit would be bypassed while the 20 A circuit would be enabled even though the 20 A circuit has a lower priority.

Figure 8C:
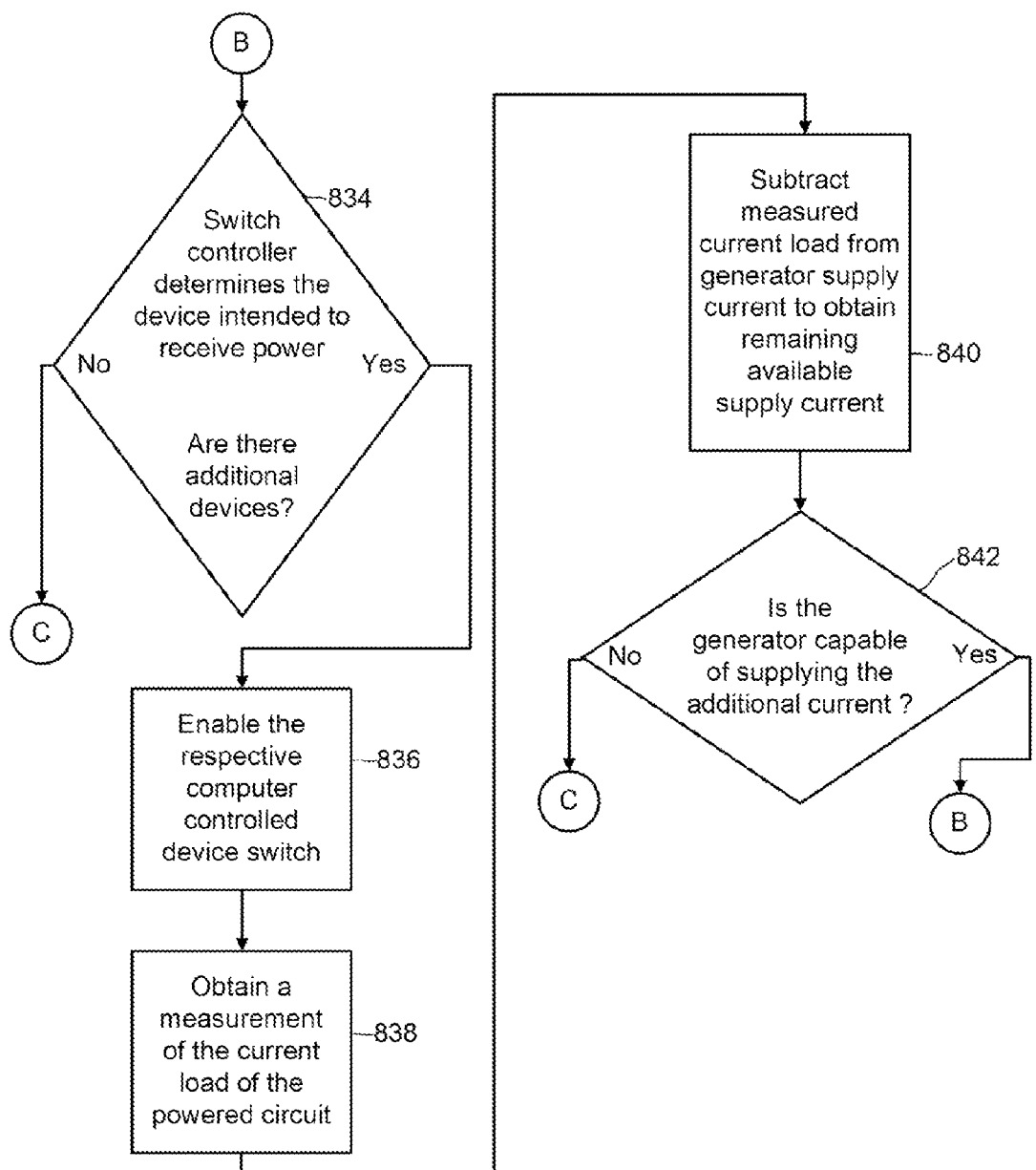

Referring to FIG. 8C, in another embodiment (see FIGS. 3B and 4), after the switch controller 110 enables a particular circuit as described above (i.e., Step 818), individual devices connected to that particular circuit are provided with power sequentially according to each device's assigned priority level. Specifically, the switch controller 110 consults the initial device priority list 401 to determine if there is any device intended to receive power (Step 834). If there is no device intended to receive power, the process returns to Step 826. If there is a device intended to receive power (e.g., device 1, which is the device with a priority level of "1", FIG. 4), the switch controller 110 enables the associated computer controlled device switch (e.g., device switch 114, FIG. 1) so that the associated device (e.g., device 112) receives power (Step 836).

The switch controller 110 then obtains a measurement of the actual current load of the powered circuit (e.g., circuit 134) to which the powered device (e.g., device 112) is connected from the associated current sensor (e.g., current sensor 124*a*, FIG. 1) (Step 838). The switch controller 110 then subtracts this current load measurement from the maximum generator supply current to obtain the actual remaining available generator supply current that can be supplied to additional devices listed in the initial device priority list (Step 840). The switch controller 110 then determines if the generator 102 is capable of supplying additional current for a next device (Step 842). If the generator is capable of supplying additional current, the process moves to Step 834. If the generator is not capable of supplying additional current, the process moves to step 826.

The above process steps are repeated until all computer controlled device switches for the devices that are intended to receive power are enabled, or until it is determined that the generator 102 cannot supply any more current.

The above-described feature enables more precise control of building power distribution than is possible with conventional backup power systems. More specifically, in the situation where a particular circuit includes both essential and nonessential devices, the above-described feature enables powering of the essential devices without needlessly powering the non-essential devices connected to the same circuit, as with typical backup power systems.

Another situation in which the above-described feature is particularly useful is when the generator 102 cannot supply enough current to support the additional current load of an entire circuit, but can supply enough current to support the current load of one or a few devices. In this case, individual devices connected to a circuit are sequentially enabled/powered (rather than the entire circuit at once). This results in smaller current loads being incrementally added to the overall current load, and thus incrementally approaching the backup generator supply current limit.

As mentioned above, the circuits listed in the initial power distribution priority profile are intended to receive backup power for only about 15-20 minutes, or for some other predetermined amount of time (i.e., initial priority time period). If this predetermined amount of time expires and power from the utility lines has not been restored, the switch controller 110 enables the computer controlled breakers/switches according to the long-term power distribution priority profile 542 (FIGS. 5A and 5B), which is described in detail below.

Figure 9A:
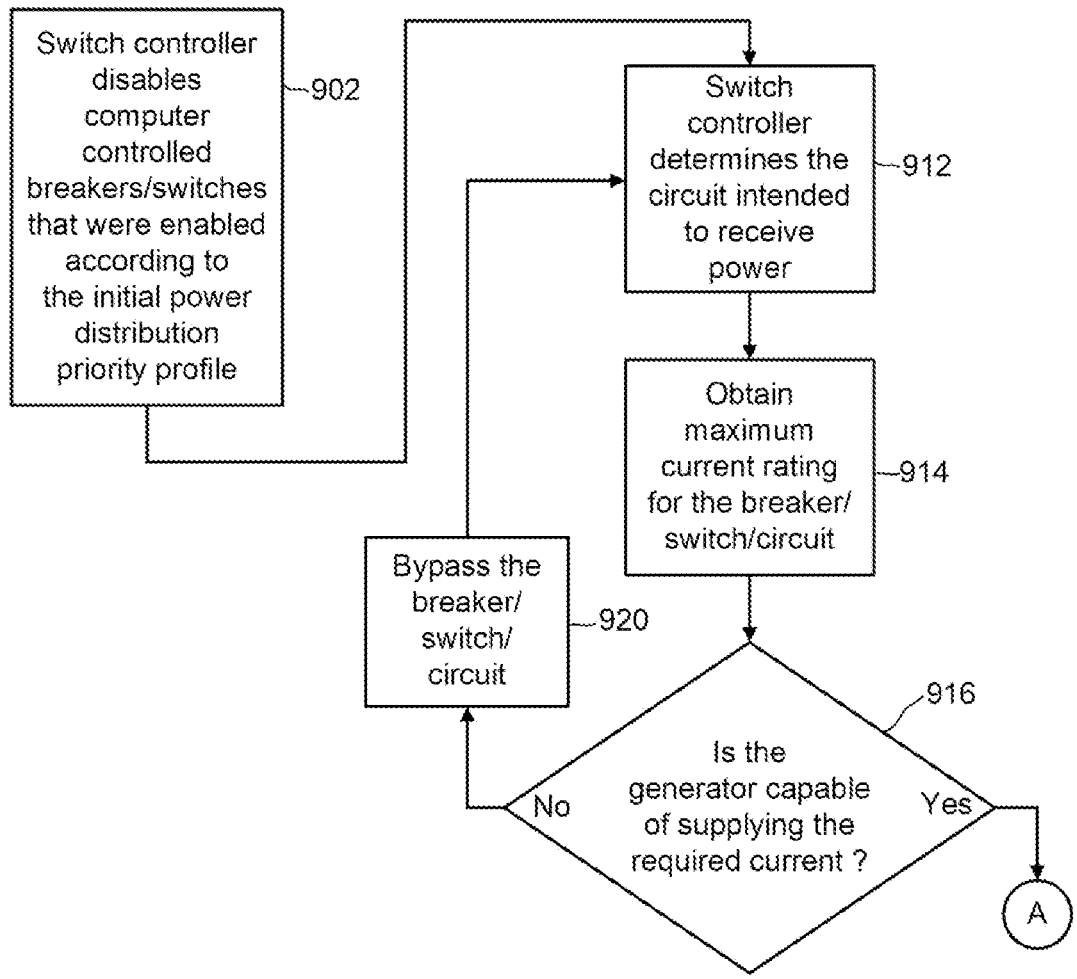
FIGS. 9A-9C are illustrative flow diagrams of the operation of the backup power system of FIG. 1 using a long-term power distribution priority profile, according to one embodiment of the invention.
Figure 9B:
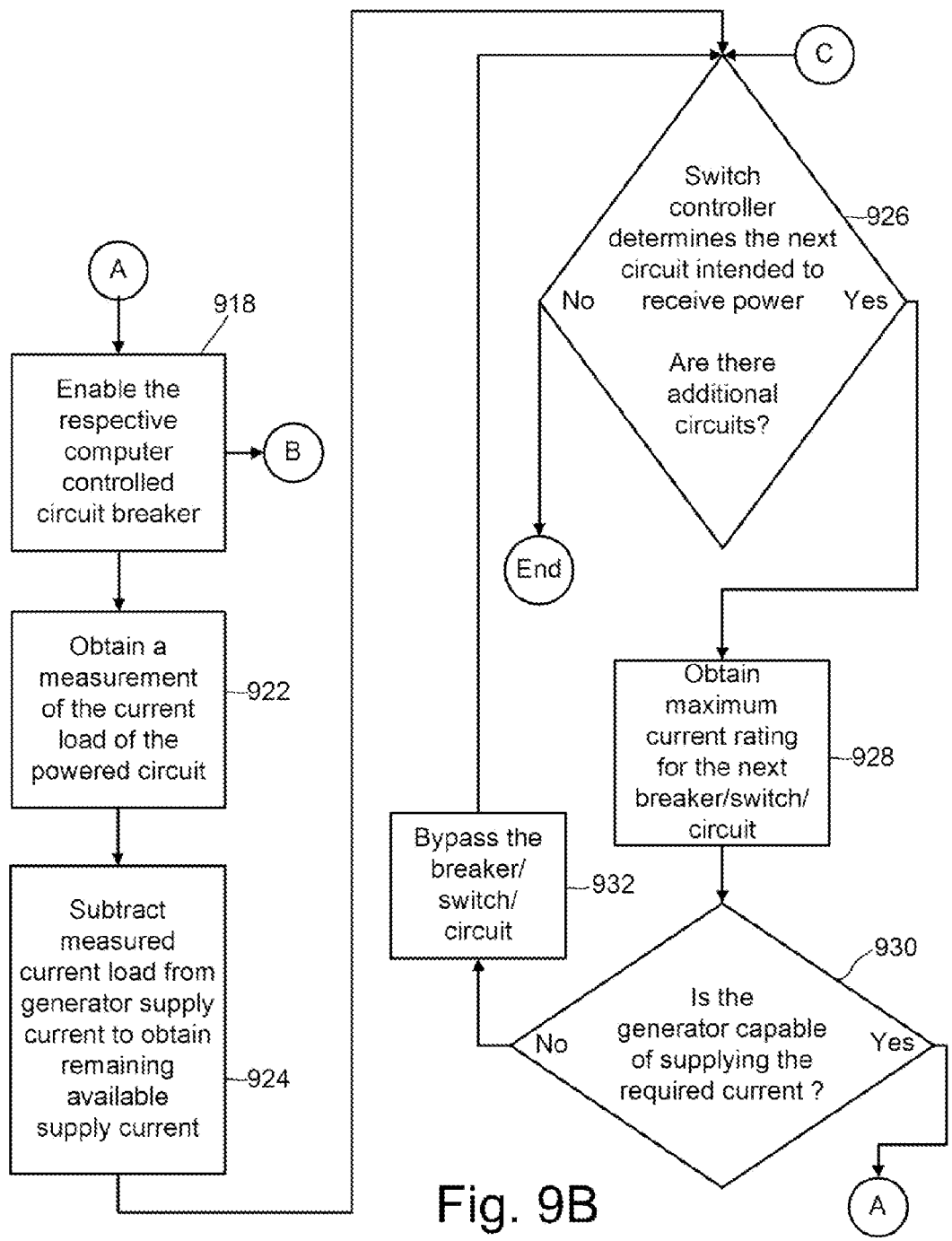

Referring to FIGS. 1 and 9A-9B, in one embodiment, operation of the complete backup power system using the long-term power distribution priority profile 542 is described. After the initial priority time period has expired, the switch controller 110 sheds (i.e., disables) computer controlled breakers/switches that were enabled according to the initial power distribution priority profile 342 (902).

In one embodiment, the switch controller 110 simply sheds (disables) all computer controlled breakers/switches that were enabled according to the initial power distribution priority profile 342 before sequentially enabling particular computer controlled breakers/switches according to the long-term power distribution priority 542.

In another embodiment, the switch controller 110 sheds (i.e., disables) the computer controlled breakers/switches that were enabled according to the initial power distribution priority profile 342 in reverse order (i.e., lowest priority first) as computer controlled breakers/switches are enabled according to the long-term power distribution priority profile 542.

The switch controller 110 next consults the currently selected long-term power distribution priority profile 542 (see FIGS. 5A, 5B) to determine which unpowered building circuit is intended to receive power (Step 912). More specifically, during a first pass, the unpowered circuit with the highest priority listed in the priority profile 542 is intended to receive power first. During a second pass, the next unpowered circuit with the next highest priority level listed in the priority profile 542 is intended to receive power second, and so on.

The switch controller 110 obtains from the initial power distribution priority profile the maximum current rating (e.g., 20 A) for the first breaker/switch/circuit (or the next if the first has been bypassed) listed in the profile (e.g., "breaker 5", which is the circuit with a priority level of "1", FIGS. 5A, 5B) (Step 914). The switch controller 110 compares the maximum generator supply current with the maximum current rating of the first breaker/switch/circuit to determine if the generator 102 is capable of supplying the required current (i.e., support the current load of the circuit) (Step 916).

If the generator 102 is capable of supplying the required current, the switch controller 110 enables the respective computer controlled circuit breaker so that the associated circuit receives power (Step 918).

If the generator 102 is not capable of supplying the required current, the switch controller 110 does not enable the respective computer controlled circuit breaker (i.e., bypasses this particular circuit breaker), and the associated circuit does not receive power (Step 920). The switch controller 110 again consults the currently selected initial power distribution priority profile 542 to determine which unpowered building circuit is intended to receive power next (Step 912). The switch controller 110 then repeats Steps 914 and 916.

After Step 918, the switch controller 110 obtains a measurement of the actual current load of the first powered circuit from the associated current sensor (Step 922). The switch controller 110 then subtracts this current load measurement from the maximum generator supply current to obtain the actual remaining available generator supply current (Step 924). This remaining available generator supply current is the current can be supplied to additional building circuits listed in the initial power distribution priority profile.

After step 924, the switch controller 110 again consults the initial power distribution priority profile 542 to determine the next unpowered building circuit that is intended to receive power (Step 926). If there are no more circuits intended to receive power, the process ends. If there are additional circuits intended to receive power, the switch controller 110 next obtains from the initial power distribution priority profile the maximum current rating for the next breaker/switch/circuit listed in the profile (e.g., "breaker 6", which is the circuit with a priority level of "2", FIGS. 5A, 5B) (Step 928). The switch controller 110 compares the available generator supply current (from Step 924) with the maximum current rating of the next breaker/switch/circuit to determine if the generator 102 is capable of supplying the required current (Step 930).

If the generator 102 is capable of supplying the required current, the switch controller 110 enables the respective computer controlled circuit breaker so that the associated circuit receives power (Step 918). The switch controller 110 then again obtains a measurement of the actual current load of the second powered circuit from the associated current sensor (Step 922), and subtracts this current load measurement from the remaining available generator supply current (Step 924) to obtain the new (now updated) actual remaining available generator supply current. The switch controller 110 then repeats steps 926, 928, and 930 as required.

If, however, the generator 102 is not capable of supplying the current required by the particular circuit, the switch controller 110 does not enable the respective computer controlled circuit breaker, and the associated circuit does not receive power (Step 932). The switch controller 110 then repeats step 926. If there are no more circuits intended to receive power, the process ends. If there are additional circuits intended to receive power, the switch controller 110 repeats steps 928 and 930.

The switch controller 110 repeats the above steps for the next breaker/switch/circuit listed in the long-term power distribution priority profile until all the listed circuits have been either enabled or bypassed.

Figure 9C:
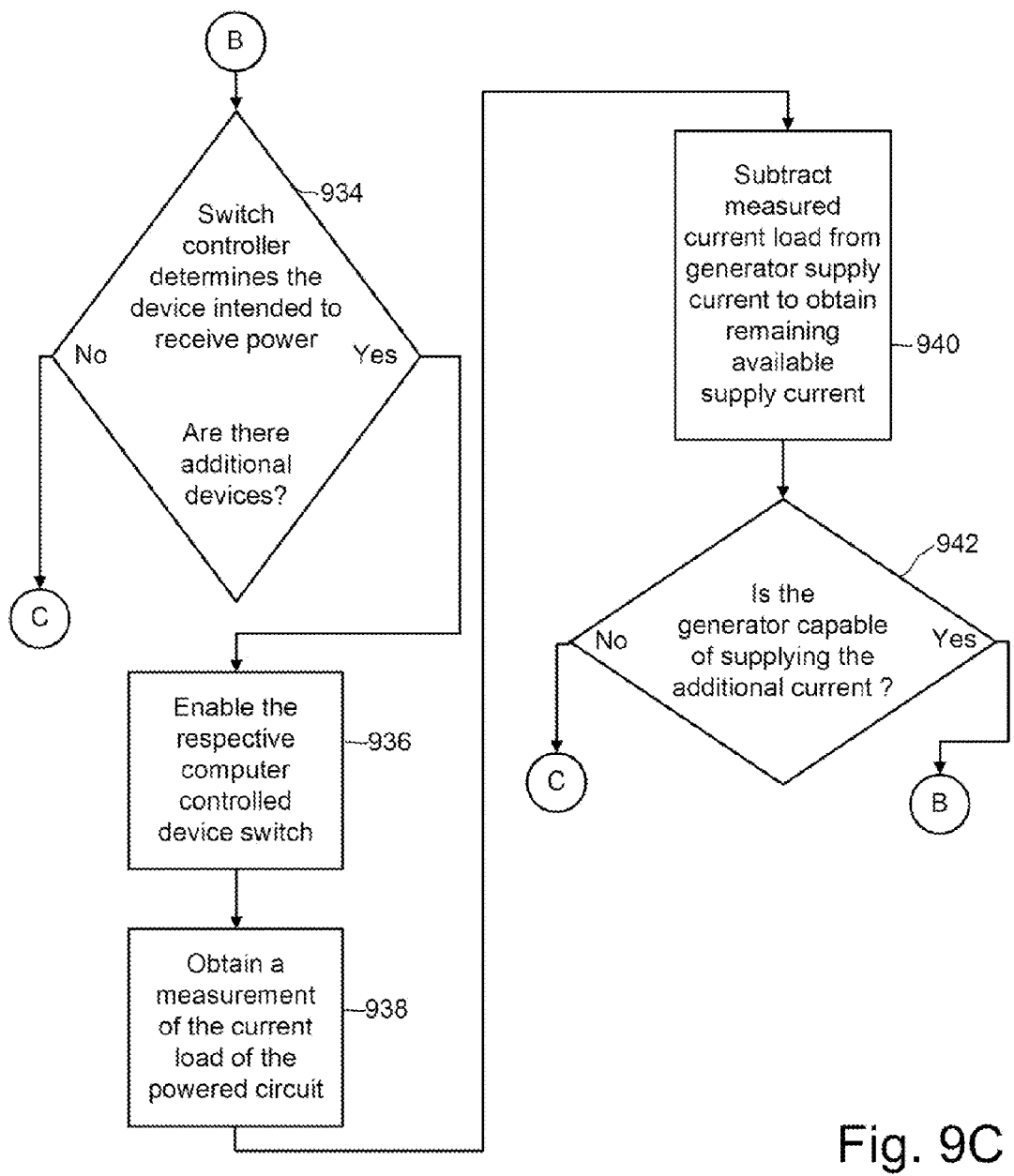

Referring to FIG. 9C, in another embodiment (see FIGS. 5B and 6), after the switch controller 110 enables a particular circuit as described above (i.e., Step 918), individual devices connected to that particular circuit are provided with power sequentially according to each device's assigned priority level. Specifically, the switch controller 110 consults the long-term device priority list 601 to determine if there is any device intended to receive power (Step 934). If there is no device intended to receive power, the process returns to Step 926. If there is a device intended to receive power (e.g., device 1, which is the device with a priority level of "1", FIG. 6), the switch controller 110 enables the associated computer controlled device switch (Step 936).

The switch controller 110 then obtains a measurement of the actual current load of the powered circuit to which the powered device is connected from the associated current sensor (Step 938). The switch controller 110 then subtracts this current load measurement from the maximum generator supply current to obtain the actual remaining available generator supply current that can be supplied to additional devices listed in the long-term device priority list (Step 940). The switch controller 110 then determines if the generator 102 is capable of supplying additional current for a next device (Step 942). If the generator is capable of supplying additional current, the process moves to Step 934. If the generator is not capable of supplying additional current, the process moves to step 926.

The above process steps are repeated until all computer controlled device switches for the devices that are intended to receive power are enabled, or until it is determined that the generator 102 cannot supply any more current.

During the above described process, the switch controller 110, whether enabling circuits or devices according to the initial or long-term power distribution profiles, continues to monitor the total current load (via the current sensors 124) to ensure that the generator 102 is not overloaded due to additional devices being added to previously enabled circuits. For example, assume that a previously enabled circuit includes one or more electrical outlets, and that at the time the particular circuit was enabled and its current load measured, no devices were connected to the one or more electrical outlets. Next, assume that some time thereafter one or devices are connected to the one or more outlets, which results in an increased current load of the particular enabled circuit. In the event the additional current load drives the cumulative current load beyond the predetermined safety margin, the switch controller 110 will shed the lowest priority devices or circuits to reduce the cumulative current load on the generator 102. If the cumulative current load on the generator 102 drops below the predetermined safety margin, any low priority devices or circuits previously shed will be re-enabled by the switch controller 110 according to the initial or long-term power distribution profiles.

In another embodiment, the switch controller 110 would re-enable previously shed circuits or devices only after a predetermined (or user-configured) time delay. This delay before re-enabling a particular circuit or device would prevent the circuit or device from being rapidly toggled off then on again. Such an "off then on" oscillation could damage sensitive equipment.

In conventional backup power systems, only the maximum current loads of the connected circuits are considered when determining how many circuits can be supported by the backup system. For example, assume that a typical backup power system supplies 100 A. Eighty amps of current would be used to power circuits and twenty amps would be used for a safety margin. Further assume that there were ten 20 A circuits intended to receive power. Clearly, the power supply would only be able to support four of these 20 A circuits.

In contrast conventional backup power systems, the disclosed backup power system measures the actual current load of each powered circuit in order to determine the actual remaining available current, which is used to power additional circuits. Using the same example as above, assume that the actual current load of each of the 20 A rated circuits was only 10 A. The backup power supply would be able to support eight of the 20 A circuits because each circuit is only drawing 10 A. Thus, using the disclosed system enables more circuits to be powered and prevents available current from going unused and wasted.

It should be noted that if the transfer switch 104 detects that power from the utility lines 108 has been restored at any time during the processes described above, the transfer switch 104 sends a status signal to the switch controller 110 to inform the switch controller that main power has been restored. The switch controller 110 then disables all computer controlled breakers/switches and waits for a second status signal from the transfer switch. The transfer switch 104 breaks the connection between the generator 102 and the breaker box 120, and then establishes the connection between the power lines 108 and the breaker box 120. The transfer switch 104 then sends the second status signal to the switch controller 100 to inform the switch controller 110 that main power is now available. In response to the second status signal, the switch controller 110 enables all computer controlled breakers/switches sequentially, thereby allowing all building circuits and devices to receive power.

Figure 10:
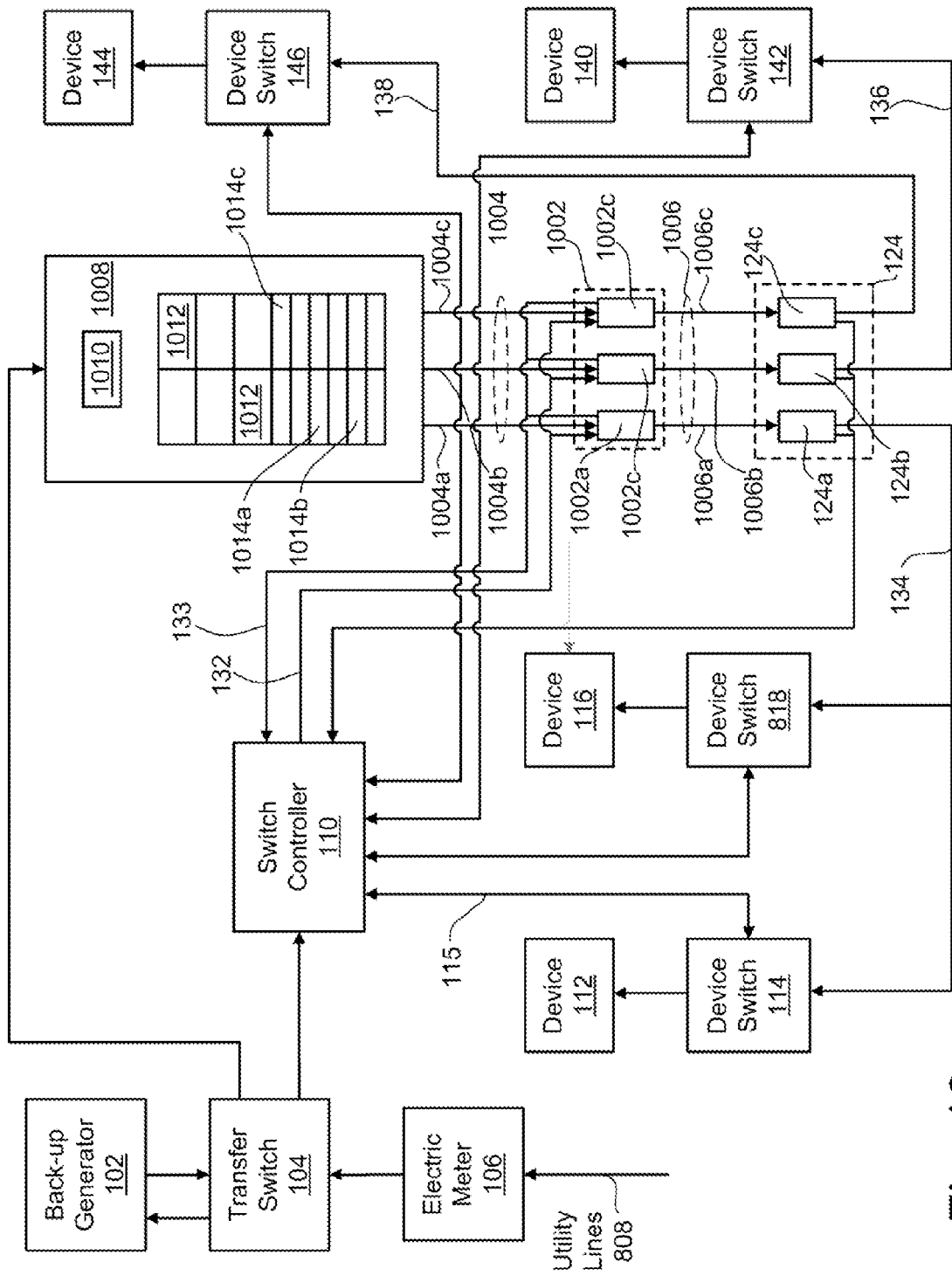
FIG. 10 is an illustrative block diagram of a backup power system, according to another embodiment of the invention.

Referring to FIG. 10, in another embodiment, a block diagram of a backup power system is shown. This embodiment of the backup power system is similar to the embodiment shown in FIG. 1 and includes the backup generator (generator) 102, the transfer switch 104, the switch controller 110, the current sensors (generally 124), and the remote (computer) controlled device switches 114, 118, 142, 146. This embodiment of the backup power system also includes computer controlled circuit switches (generally 1002) (e.g., digitally controlled TRIACs) and conventional circuit breakers 1010, 1012, 1014a, 1014b, 1014c, which are disposed in a breaker box 1008.

The switch controller 110 provides switch control signals 132 (e.g., open or close breaker/switch) to the computer controlled circuit switches 1002. The switch controller 110 receives status signals 133 (e.g., breakers/switches open or closed) from the circuit switches 1002. The switch controller 110 also provides control signals (e.g., open or close) to, and receives status signals (e.g., switch open or closed) from, the computer controlled device switches 114, 118, 142, 146 via lines 115.

A plurality of individual electrical circuit lines (generally 1004) originate and extend from the breaker box 1008. Each of the individual electrical circuit lines 1004 is connected to a separate circuit switch 1002. Each of the separate circuit switches 1002 is connected to an individual electrical circuit line (generally 1006). Each of the individual electrical circuit lines 1006 is connected to a current sensor (generally 124).

In the exemplary embodiment shown in FIG. 10, only three computer controlled circuits are shown. Specifically, circuit line 1004a (from breaker 1014a) connects to circuit switch 1002a, which connects to current sensor 124a via circuit line 1006a; circuit line 1004b (from breaker 1014b) connects to circuit switch 1002b, which connects to current sensor 124b via circuit line 1006b; and circuit line 1004c (from breaker 1014c) connects to circuit switch 1002c, which connects to current sensor 124c via circuit line 1006c.

In other embodiments, more or less computer controlled circuits (with current sensors) are included. In a preferred embodiment, each of the circuits connected to the breaker box 1008 are connected to a computer controlled circuit switch. In other words, all the circuits originating from the breaker box 1008 can be enabled or disabled via computer controlled circuit switches, and each circuit is connected to a separate current sensor.

Still referring to FIG. 10, the current sensor 124a is connected to (is part of) circuit 134, which includes computer controlled device switches 114, 118 and devices 112 116. The current sensor 124b connects to (is part of) circuit 136, which includes computer controlled device switch 142 and device 140. The current sensor 124c connects to (is part of) circuit 138, which includes computer controlled device switch 146 and device 144. Each current sensor 124a, 124b, 124c measures the current load of the respective one of the plurality of circuits 134, 136, 138 by methods known to those skilled in the art, and transmits/reports the measured current load to the switch controller 110.

Each computer controlled circuit switch 1002a, 1002b, 1002c controls current flow to the respective circuit 134, 136, 138. Each device switch 114, 118, 146, 142 controls current flow to the respective device 112, 116, 140, 144. Based on the cumulative measured current loads of the powered circuits and devices, the switch controller 110 determines whether or not to enable (turn on) the computer controlled circuit switch for the next circuit or the computer controlled device switch for the next device listed in the power distribution priority profile, which is described in detail above.

Figure 11:
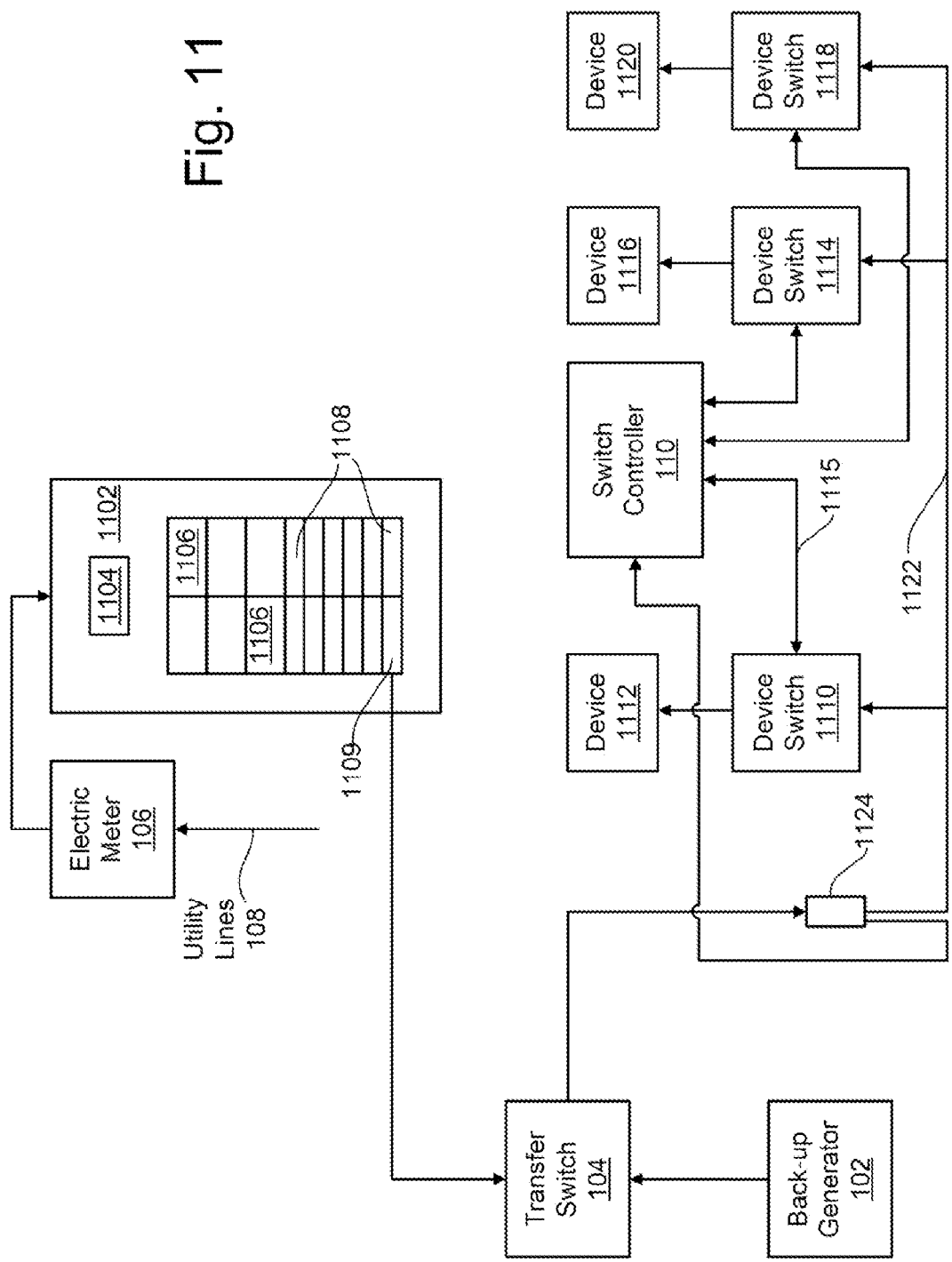
FIG. 11 is an illustrative block diagram of a backup power system, according to still another embodiment of the invention.

Referring to FIG. 11, in yet another embodiment, a block diagram of a backup power system is shown. In contrast to the embodiments shown in FIGS. 1 and 10, which are configured for providing backup power to most or all building circuits, the embodiment of FIG. 11 is configured for providing backup power to only one building circuit (i.e., a circuit connected to one particular circuit breaker).

The backup power system of FIG. 11 includes the backup generator 102, the transfer switch 104, the switch controller 110, a current sensor 1124, remote (computer) controlled device switches 1110, 1114, 1118, a master circuit breaker 1104, and conventional circuit breakers 1106, 1108, and 1109, which are disposed in a breaker box 1102.

The switch controller 110 provides control signals (e.g., open or close) to, and receives status signals (e.g., switch open or closed) from, the computer controlled device switches 1110, 1114, 1118 via lines 1115. Each computer controlled device switch 1110, 1114, 1118 controls current flow to the respective device 1112, 1116, 1120.

The current sensor 1124, the computer controlled device switches 1110, 1114, 1118, and the devices 1112, 1116, 1120 are part of circuit 1122. The current sensor 1124 measures the current load of the circuit 1122 by methods known to those skilled in the art, and transmits/reports the measured current load to the switch controller 110.

Under normal operation, when power is supplied via the power lines 108, each of the breakers in the breaker box 1102 allows current to flow to the respective connected circuits throughout the building. The transfer switch 104, which is disposed between the circuit breaker 1109 and the circuit 1122, allows current to flow to circuit 1122. When power is interrupted, electrical power to the breaker box 1102 stops. Consequently, current stops flowing to the transfer switch 104 from circuit breaker 1109. The transfer switch 104 then functions as previously described in detail above, and power is provided by the generator 102 (through the transfer switch 104) to only the circuit 1122 (and devices connected thereto).

In response to the current measurements made by the current sensor 1124 (i.e., based on the cumulative current load of the devices in the circuit 1122), the switch controller 110 sequentially enables the computer controlled device switches 1110, 1114, 1118 according to the initial and long-term power distribution priority profiles, as described in detail above.

Figure 12:
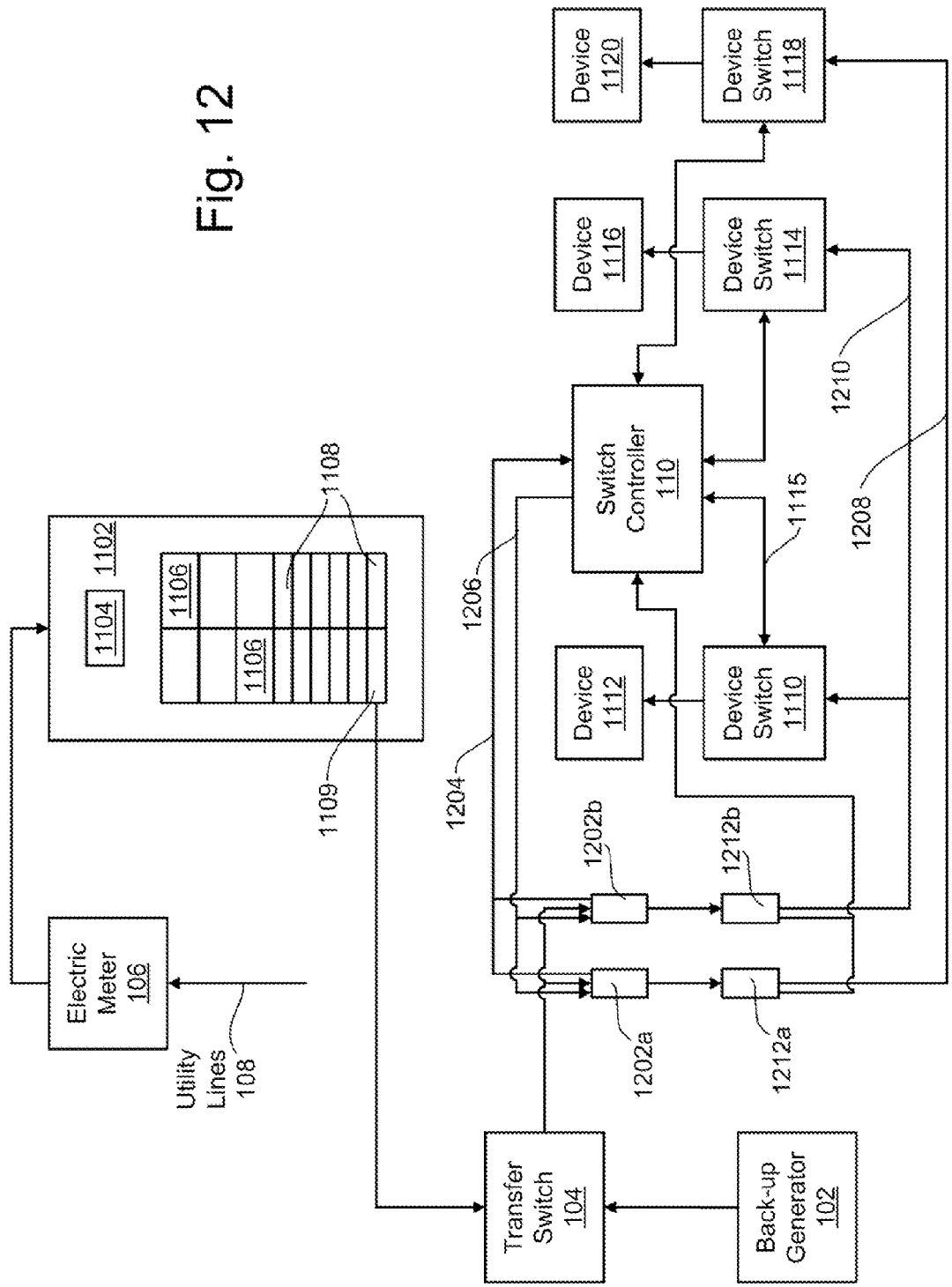
FIG. 12 is an illustrative block diagram of a backup power system, according to yet another embodiment of the invention.

Referring to FIG. 12, in still another embodiment, a block diagram of a backup power system is shown. This embodiment of the backup power system is a variation of the embodiment shown in FIG. 11. Specifically, FIG. 12 shows the circuit originating from circuit breaker 1109 being divided into two separate circuits.

The backup power system of FIG. 12 includes the backup generator 102, the transfer switch 104, computer controlled circuit switches 1202a, 1202b, the switch controller 110, current sensor 1212a, 1212b, computer controlled device switches 1110, 1114, 1118, a master circuit breaker 1104, and the conventional circuit breakers 1106, 1108, and 1109, which are disposed in the breaker box 1102.

The switch controller 110 provides control signals 1206 to, and receives status signals 1204 from, the computer controlled switches 1202a, 1202b. The switch controller 110 also provides control signals (e.g., open or close) to, and receives status signals (e.g., switch open or closed) from, the computer controlled device switches 1110, 1114, 1118 via lines 1115. Each computer controlled device switch 1110, 1114, 1118 controls current flow to the respective device 1112, 1116, 1120.

The current sensor 1212a, the computer controlled device switch 1118 and the device 1120 are part of circuit 1208. The current sensor 1212b, the computer controlled device switches 1110, 1114, and the devices 1112, 1116, are part of circuit 1210. The transfer switch 104 is disposed between the generator 102 and the computer controlled circuit switches 1202a, 1202b. The computer controlled circuit switch 1202a allows current to flow from the transfer switch 104 to the circuit 1208 and the computer controlled current switch 1202b allows current to flow from the transfer switch to the circuit 1210. The current sensor 1212a measures the current load of the circuit 1208 and the current sensor 1212b measures the current load of the circuit 1210. Both current measurements are transmitted to the switch controller 110.

Under normal operation, when power is supplied via the power lines 108, each of the breakers in the breaker box 1102 allows electricity to flow to the respective connected circuits throughout the building. When power is interrupted, electrical power to the breaker box 1102 stops. Consequently, current stops flowing to the transfer switch 104 from circuit breaker 1109. The transfer switch 104, which is disposed between the circuit breaker 1109 and the current switches 1202a, 1202b, then functions as previously described in detail above, and power is provided by the generator 102.

In response to the current measurements made by the current sensors 1212a, 1212b (i.e., based on the measured cumulative current load), the switch controller 110 sequentially enables the computer controlled circuit switches 1202a, 1202b and the computer controlled device switches 1110, 1114, 1118 according to the initial and long-term power distribution priority profiles, as described in detail above.

List of Acronyms used in the Detailed Description

The following is a list of the acronyms used in the specification in alphabetical order.
A Amperes
TRIAC triode for alternating current Alternate Embodiments Variations, modifications, and other implementations of what is described herein may occur to those of ordinary skill in the art without departing from the spirit and scope of the invention. Accordingly, the invention is not to be defined only by the preceding illustrative description.

What is claimed is:

1. A method of providing backup power to each of a plurality of circuits in a building, the method comprising:
   a) supplying current to a first of the plurality of circuits according to a power distribution priority profile only if available current is greater than a maximum current rating of the first of the plurality of circuits and bypassing the first of the plurality of circuits if the available current is not greater than the maximum current rating of the first of the plurality of circuits;
   b) measuring a current load of the first of the plurality of circuits after current has been supplied;
   c) subtracting the measured current load the first of the plurality of circuits from the available current;
   d) supplying current to a next of the plurality of circuits according to the power distribution priority profile only if the available current is greater than a maximum current rating of the next of the plurality of circuits and bypassing the next of the plurality of circuits if the available current is not greater than the maximum current rating of the next of the plurality of circuits;
   e) measuring the current load of the next of the plurality of circuits after current has been supplied;
   f) subtracting the measured current load of the next of the plurality of circuits from the available current;
   g) repeating steps d)-f) until each of the plurality of circuits is supplied current, the available current is not greater than a maximum current rating of any of the plurality of circuits not being supplied current, or the available current reaches a predetermined minimum threshold.

2. The method of claim 1, wherein the power distribution priority profile is either an initial power distribution priority profile or a long-term power distribution priority profile.

3. The method of claim 2, wherein current is supplied to the plurality of circuits according to the initial power distribution priority profile for a time period of 15-20 minutes following a loss of main power.

4. The method of claim 3, wherein current is supplied to the plurality of circuits according to the long-term power distribution priority profile after the time period 15-20 minutes elapses and until main power is restored.

5. The method of claim 1, further comprising continuously measuring the current load of each of the plurality of circuits being supplied current.

6. The method of claim 1, further comprising shedding one or more of the plurality of circuits being supplied current according to the power distribution priority profile if the available current falls below the predetermined minimum threshold.

7. The method of claim 1, further comprising sequentially supplying current to individual devices in electrical communication with one of the plurality of circuits.

8. The method of claim 7, further comprising measuring the current load of the one of the plurality of circuits after each individual device is supplied current.

9. The method of claim 7, further comprising sequentially supplying current to the individual devices in electrical communication with the one of the plurality of circuits according to a device priority list.

10. The method of claim 9, wherein the device priority list is either an initial device priority list or a long-term device priority list.

11. A method of providing backup power to each of a plurality of circuits in a building, the method comprising:
  a) supplying current to a first of the plurality of circuits only if available current is greater than a maximum current rating of the first of the plurality of circuits and bypassing the first of the plurality of circuits if the available current is not greater than the maximum current rating of the first of the plurality of circuits;
  b) measuring a current load of the first of the plurality of circuits after current has been supplied;
  c) subtracting the measured current load the first of the plurality of circuits from the available current;
  d) supplying current to a next of the plurality of circuits only if the available current is greater than a maximum current rating of the next of the plurality of circuits and bypassing the next of the plurality of circuits if the available current is not greater than the maximum current rating of the next of the plurality of circuits;
  e) measuring the current load of the next of the plurality of circuits after current has been supplied;
  f) subtracting the measured current load of the next of the plurality of circuits from the available current;
  g) repeating steps d)-f) until each of the plurality of circuits is supplied current, the available current is not greater than a maximum current rating of any of the plurality of circuits not being supplied current, or the available current reaches a predetermined minimum threshold.

12. The method of claim 11, further comprising continuously measuring the current load of each of the plurality of circuits being supplied current.

13. The method of claim 11, further comprising shedding one or more of the plurality of circuits being supplied current according to the power distribution priority profile if the available current falls below the predetermined minimum threshold.

14. The method of claim 11, further comprising executing steps a)-g) according to a power distribution priority profile.

15. The method of claim 14, wherein the power distribution priority profile is either an initial power distribution priority profile or a long-term power distribution priority profile.

16. The method of claim 15, wherein current is supplied to the plurality of circuits according to the initial power distribution priority profile for a time period of 15-20 minutes following a loss of main power.

17. The method of claim 16, wherein current is supplied to the plurality of circuits according to the long-term power distribution priority profile after the time period 15-20 minutes elapses and until main power is restored.

* * * * *